US007245906B2

(12) United States Patent
Hirata

(10) Patent No.: US 7,245,906 B2
(45) Date of Patent: Jul. 17, 2007

(54) UI CONTENT CREATING METHOD, UI CONTENT CREATING APPARATUS AND UI CONTENT CREATING SYSTEM

(75) Inventor: Masafumi Hirata, Ichikawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 92 days.

(21) Appl. No.: 11/107,920

(22) Filed: Apr. 18, 2005

(65) Prior Publication Data

US 2006/0009205 A1    Jan. 12, 2006

(30) Foreign Application Priority Data

Jul. 9, 2004    (JP)    ............................. 2004-203770

(51) Int. Cl.
*H04M 3/00* (2006.01)
(52) U.S. Cl. ................. 455/418; 455/412.1; 455/550.1
(58) Field of Classification Search ................ 455/418, 455/420, 186.1, 412.1, 550.1; 709/225, 223, 709/246, 204
See application file for complete search history.

(56) References Cited

U.S. PATENT DOCUMENTS

| 6,983,479 B1* | 1/2006 | Salas et al. .................... 725/23 |
| 2002/0016166 A1* | 2/2002 | Uchida et al. .............. 455/419 |
| 2004/0049579 A1* | 3/2004 | Ims et al. .................... 709/225 |
| 2004/0242203 A1* | 12/2004 | Lipsanen et al. ........ 455/412.1 |

FOREIGN PATENT DOCUMENTS

| JP | 2003-044379 | 2/2003 |
| JP | 2003-208253 | 7/2003 |
| JP | 2003-223454 | 8/2003 |
| JP | 2003-331309 | 11/2003 |

OTHER PUBLICATIONS

Kazuma Ando, "Keitai Denwa Muke EC Site) Tsukuru" Nikkei Internet Technology, Jun. 22, 2000 No. 36, pp. 114 to 131, ISSN: 1343-1676.

* cited by examiner

*Primary Examiner*—Danh Le
(74) *Attorney, Agent, or Firm*—Birch, Stewart, Kolasch & Birch, LLP

(57) ABSTRACT

In this UI content creating system, when the user controls an AV appliance 50 using a cellular phone 60, the user requests UI content creation server 10 to create the UI content for the items the user wishes to control via cellular phone 60. A UI content creation server 10, in response to the creation request, obtains information from an information server 30 and creates UI content and delivers the UI content to cellular phone 60. The user controls the AV appliance 50 by cellular phone 60 following the control procedures of the UI content. In this way, it is possible to create various kinds of UI content for presenting control of appliances, by taking in information provided from various network services.

18 Claims, 21 Drawing Sheets

FIG. 4
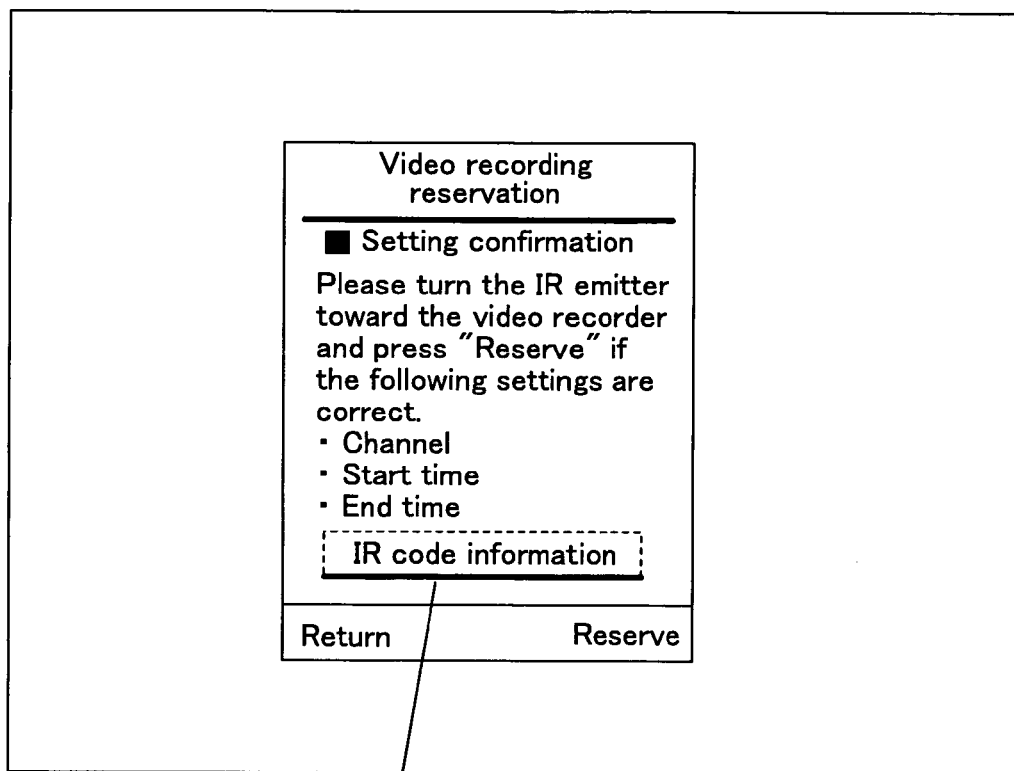
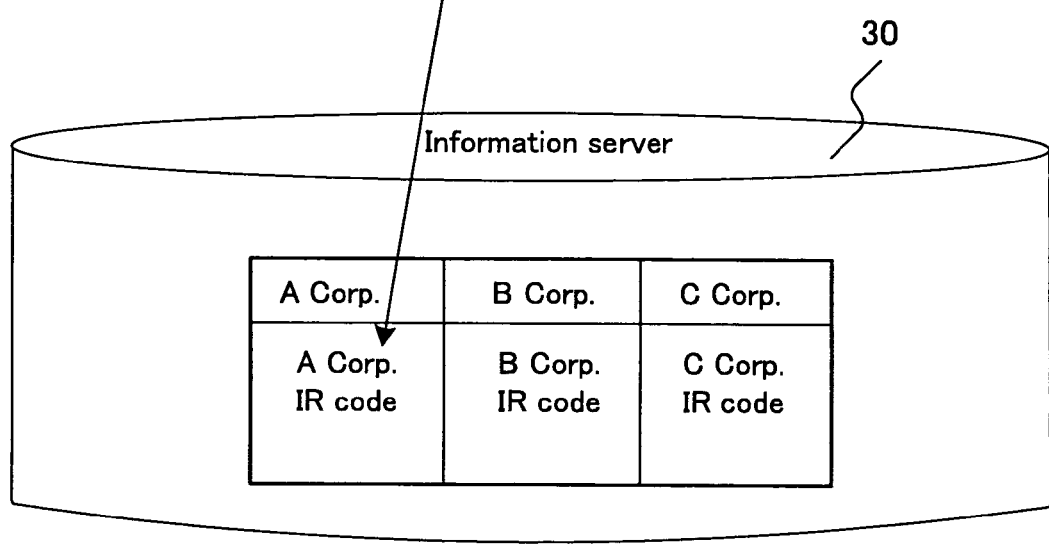

FIG. 9
(a)
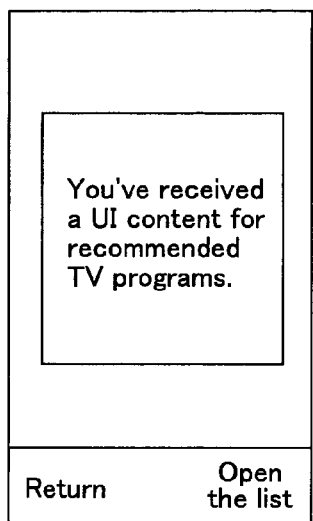
(b)
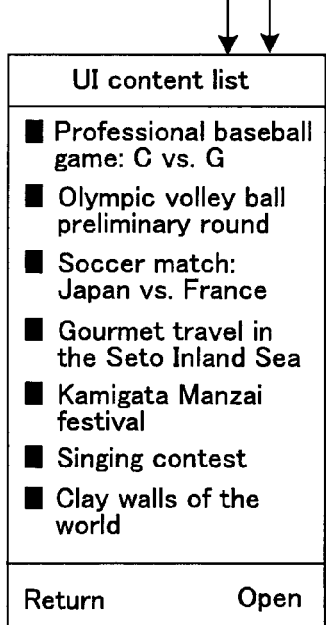
(c)
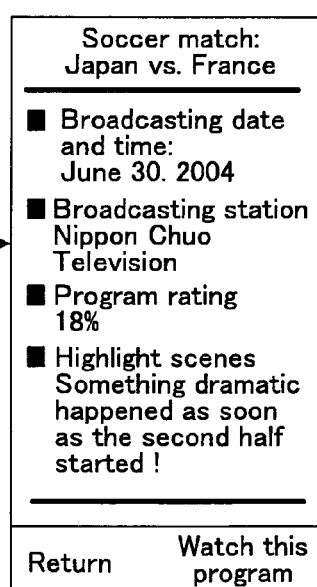
(d)
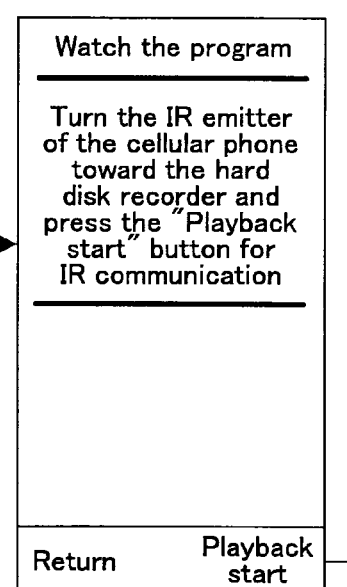

FIG. 11

[Video playback UI content creation data1. xhtml]
<xhtml>
<body>
<form action="mmproc: //localhost/Video playback UI content2. xhtml "method="POST">
<center>

<-%%http://TV program information server/recommended program/program title%%->

<center/>
<hr/>
■ Broadcast date and time<br/>

<-%%http: //TV program information server/recommended program/broadcasting date and time%%-><br/>

■ Broadcasting station<br/>

< -%%http : //TV program information server/recommended program/broadcasting station%%- ><br/ >

■ Program rating<br/>

<-%%http: //TV program information server/ recommended program/program rating%%- ><br/ >

■ Highlight scenes<br/>

<-%%http : //TV program information server/ recommended program/highlight scene%%-><br/>

<input type="submit"value="watch this program">
</form>
<hr/>
</body>
</xhtml>

Data is obtained from the location designadted by the interior tagged by <-%%%-> to replace the current tag <-%%%-> with the obtained data.

[Video playback UI content creation data2.xhtml]
<xhtml>
<body>
<form action= "mmproc://localhost/Ir/ method=" POST " >

<-%%http : //TV program information server/ recommended program/IR code%%->

<center>watch the program</center>
<hr/>
Turn the IR emitter of the cellular phone toward the hard disk recorder and press the " Playback start" button for IR communication
<hr/>
<input type="submit"value="Playback start"/>
</form>

FIG. 12

[Video playback UI content1. xhtml]
<xhtml>
<body>
<form action="mmporc : //localhost/video playback UI content2. xhtml"method="POST">
<center>
Soccer Japan vs. France
<center/>
<hr/>
■ Broadcasting date and time<br/>
June 30, 2004      <br/>
■ Broadcasting station<br/>
Nippon Chuo Television <br/>
■ Program rating<br/>
18%   <br/>
■ Highlight scenes<br/>
Something dramatic happened as soon as the second half started ! !   <br/>
<input type="submit"value="watch this program"/>
</form>
<hr/>
</body>
</xhtml>

[Video playback UI content2. xhtml]
<xhtml>
<body>
<form action="mmproc://localhost/ir/EgE3gfs234b3 method="POST">
<center>watch the program</center>
<hr/>
Turn the IR emitter of the cellular phone toward the hard disk recorder and press the " Playback start" button for IR communication
<hr/>
<input type="submit"value=" Playback start"/>
</form>

One example of the tag used to transfer to "video playback UI content2. xhtml" in the same terminal when the "Watch this program" button is pressed Among UI content creation data, the portions substituted by the externally acquired data One example of the tag used to transmit data from the IR transmitter when the Playback start" button is pressed One example of the data to be sent to the hard disk recorder to designate the video to be played

UI CONTENT CREATING METHOD, UI CONTENT CREATING APPARATUS AND UI CONTENT CREATING SYSTEM

TECHNICAL FIELD

The present invention relates to a UI content creating method, UI content creating apparatus and UI content creating system for providing UI (User Interface) content for instructing the user in the operating method of the network service, household electrical appliances and the like, to the user's terminal via the Internet or the like.

DISCLOSURE OF THE PRIOR ART

With development of the Internet, home networks, cellular phone networks and the like and evolution of interconnection between these, services for delivering content created on a server on a network to PCs, cellular phones, digital home appliances such as televisions, and services for permitting the content created on a server to be used by acquisition via the terminals have become widespread.

Recently, the functions capable of being used on individual terminals have become more and more complex, and it has become difficult for users to learn how to use these functions. To deal with this situation, there is an idea that the UI (User Interface) content for instructing the user in how to use the functions is provided in the above service. "UI content" here means description data for presenting the user a series of operating procedures for digital electrical appliances such as cellular phones, digital televisions and the like. This permits the user to easily execute wanted operations following the instructions of the UI content, hence has the advantage of eliminating the user's necessity for reading the manual and the like.

In order to offer such UI content to the user, it is necessary to create UI content which supports every kind of operation. In order to make the creation simple, the following method can be considered.

As disclosed in, for example, Patent Application Laid-open 2003-331309, in order to create animation data based on a vector animation technology, the user uses software dedicated for creating animation. In order to implement this efficiently, templates as pattern models for animation data have been prepared in advance, so as to allow the templates to be modified to create animation data. Upon this, intermediate data called metatemplates is introduced, so that various kinds of templates can be readily created by converting basic information contained in the metatemplates.

From the description of Patent Application Laid-open 2003-331309 it is possible to contemplate that UI content can be created by converting the predetermined information into another pieces of information, based on the intermediate data such as metatemplates or the like. However, since this scheme is not expected to use data from without via a network, etc., it is necessary to have all the information stored in advance. There is hence a drawback that it is difficult to instantly create a variety of UI content.

DISCLOSURE OF INVENTION

In order to solve the above problem, the object of the present invention is to provide a UI content creating method, UI content creating apparatus and UI content creating system for easy creation of a variety of UI content for indicating appliance control by acquiring information provided from various network services.

The present invention is characterized by a UI content creating method for providing UI content presenting a series of control procedures for a user terminal, comprising: a step of receiving the input of UI content creation request data via a communication means; a step of interpreting the UI content creation data presenting the positions to be substituted with data and the resource locations of the data for substitution, based on the received UI content creation request data, in order to create UI content; a step of creating UI content data by acquiring data by the communication means and entering the data into the positions to be substituted in the UI content creation data, in accordance with the interpreted positions to be substituted and the indication of the data resource locations; and a step of outputting the UI content data to the terminal by way of the communication means.

Also the method may further include: a step of selecting UI content creation data from a UI content creation data storage means that stores the UI content creation data, based on the creation request data; a step of storing all items of created UI content after creation of UI content data; and a step of selecting the necessary items of UI content from the UI content storage means, in accordance with the creation request data.

Further, the invention is characterized by a UI content creating apparatus for providing UI content presenting a series of control procedures for a user terminal, comprising: a communication means for implementing data communication with the outside; an input means for receiving the input of UI content creation request data via the communication means; a UI content creation data interpreting means for interpreting the UI content creation data presenting the positions to be substituted with data and the resource locations of the data for substitution, based on the received UI content creation request data; a UI content creation data substituting means for creating UI content data by acquiring data by the communication means and entering the data into the positions to be substituted in the UI content creation data, in accordance with the interpreted positions to be substituted and the indication of the data resource locations; and a UI content data output means for outputting the UI content data to the terminal by way of the communication means.

Also the apparatus may further include: a UI content creation data storage means for storing the UI content creation data; a UI content creation data selecting means for selecting UI content creation data from the UI content creation data storage means, based on the input UI content creation request data; a UI content storage means for storing all items of created UI content; and a UI content selecting means for selecting the necessary items of UI content from the UI content storage means, in accordance with the creation request data.

Further, the invention is characterized by a UI content creating system comprising: the above UI content creating apparatus; a terminal for receiving provision of UI content; and, an information server for providing data for creating UI content to the UI content creating apparatus, all the components being connected through a network or communications net, wherein the terminal outputs UI content creation request data to the UI content creating apparatus, and the UI content creating apparatus outputs the created UI content to the terminal.

Also, the system is characterized in that when the user selects an operation that needs a new UI content, the terminal outputs data for a creation request of the UI content.

Further, the invention is characterized by a UI content creating system comprising: the above UI content creating apparatus; a terminal for receiving provision of UI content; and, an information server for providing data for creating UI content to the UI content creating apparatus, all the components being connected through a network or communications net, wherein the information server outputs UI content creation request data to the UI content creating apparatus, and the UI content creating apparatus outputs the created UI content to the terminal.

The invention is also characterized by a UI content creating system comprising: the above UI content creating apparatus; a terminal for receiving provision of UI content; and, an information server for providing data for creating UI content to the UI content creating apparatus, all the components being connected through a network or communications net, wherein the information server outputs UI content creation request data to the UI content creating apparatus and outputs the created UI content to the terminal, and the UI content creating apparatus outputs created UI content to the information server.

The terminal may be characterized by establishing connection with the information server by means of the UI content and obtains the necessary information therefrom.

Further, the invention is characterized by a UI content creating system comprising: the above UI content creating apparatus; a terminal for receiving provision of UI content; and, an information server for providing data for creating UI content to the UI content creating apparatus, all the components being connected through a network or communications net, wherein the information server outputs UI content creation request data to the UI content creating apparatus and outputs the created UI content to the terminal, the UI content creating apparatus outputs created UI content to the information server, and the terminal outputs the information that is prepared on the terminal in accordance with the UI content, to the information server.

The information server may be characterized by being able to disclose the information prepared by the terminal to other terminals and outputs a UI content that allows for reading of the terminal-created information to each terminal.

According to the present invention, UI content creation data is interpreted based on the UI content creation request data so as to create the UI content by acquiring external information via the Internet and the like. Therefore, it is possible to create various kinds of UI content instantly and easily without the necessity of storing data in the own UI content creating apparatus. Further, since, for the users using terminals, the operation procedures are displayed as required without the necessity of reading the manual and the like, the users have the benefit of acquiring control and information in an easy manner.

BRIEF DESCRIPTION OF DRAWINGS

FIG. 4 is an illustrative diagram showing UI content creation data for video recording reservation.

FIG. 9 is an illustrative diagram showing changes of UI content display for video playback in a cellular phone.

FIG. 11 is an illustrative diagram showing the details of UI content creation data based on XML.

FIG. 12 is an illustrative diagram showing the UI content of which data substitution is made for UI content creation data.

SPECIFIC EMBODIMENT OF THE INVENTION

The embodiments of the present invention will herein below be described with reference to the accompanying drawings.

Embodiment 1

Figure 1:
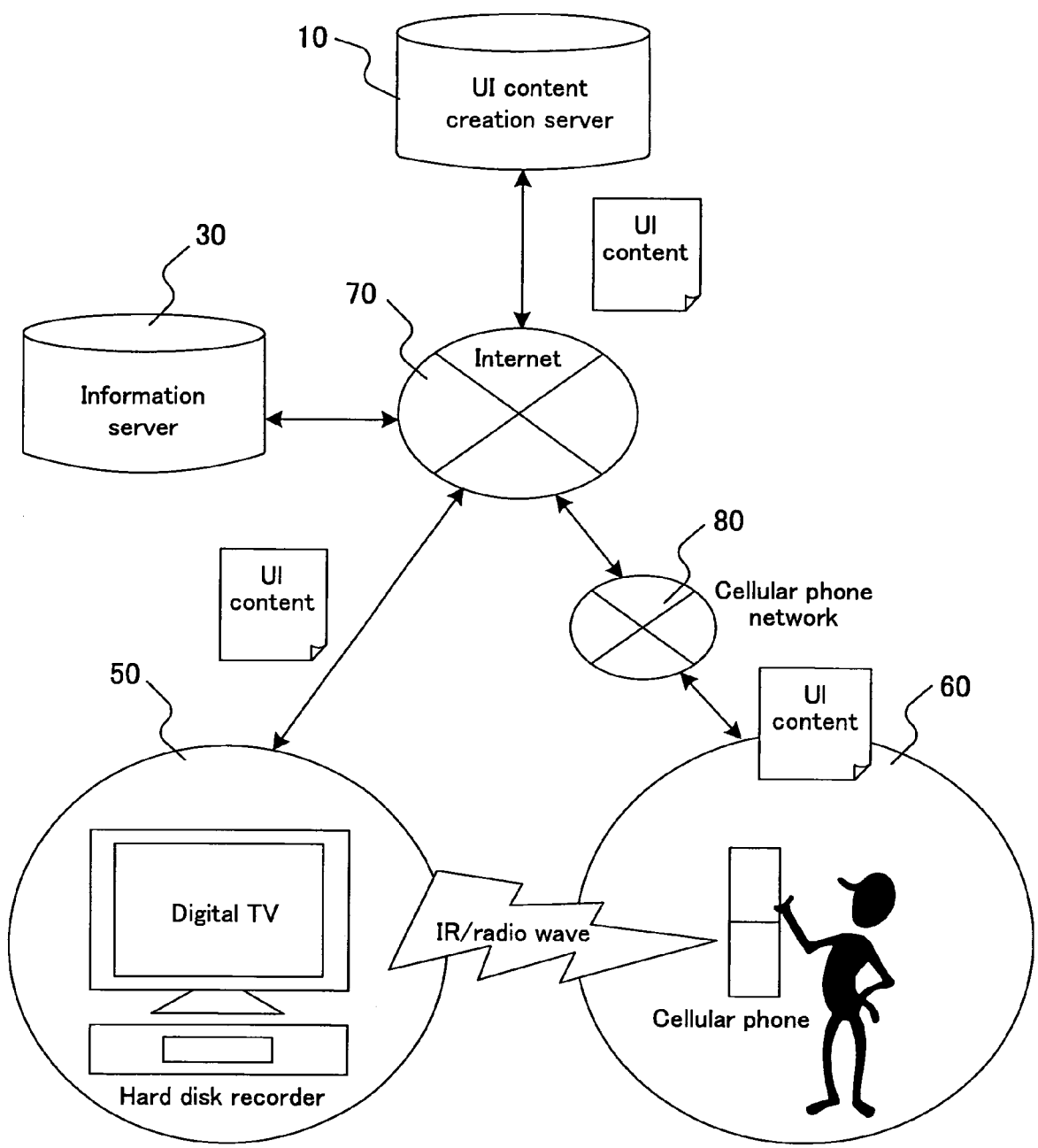
FIG. 1 is a structural diagram showing the first embodiment of a UI content creating system according to the present invention.

FIG. 1 is a structural diagram showing the first embodiment of a UI content creating system according to the present invention.

The UI content creating system comprises: a UI content creation server 10; an information server 30; an AV appliance (terminal) including a digital television and hard disk recorder; a cellular phone (terminal) 60; Internet 70; and a cellular phone network 80.

UI content creation server 10 is a server that creates and distributes UI content. Information server 30 is a server that provides information for creating UI content to UI content creation server 10. AV appliance 50 and cellular phone 60 correspond to the terminals of the server and are appliances for receiving television programs and distribution of UI content. These are all connected via Internet 70, and the cellular phone 60 is connected via Internet 70 and cellular phone network 80. Cellular phone 50 has a R/C function (remote control function) capable of controlling AV appliance 50 by infrared (IR) or radio wave.

In this UI content creating system, when the user controls an AV appliance 50 using cellular phone 60, the user requests UI content creation server 10 to create the UI content for the items the user wishes to control via cellular phone 60. UI content creation server 10, in response to the creation request, obtains information from information server 30 and creates UI content and delivers the UI content to cellular phone 60. The user controls the AV appliance 50 with cellular phone 60 following the control procedures of the UI content.

Figure 2:
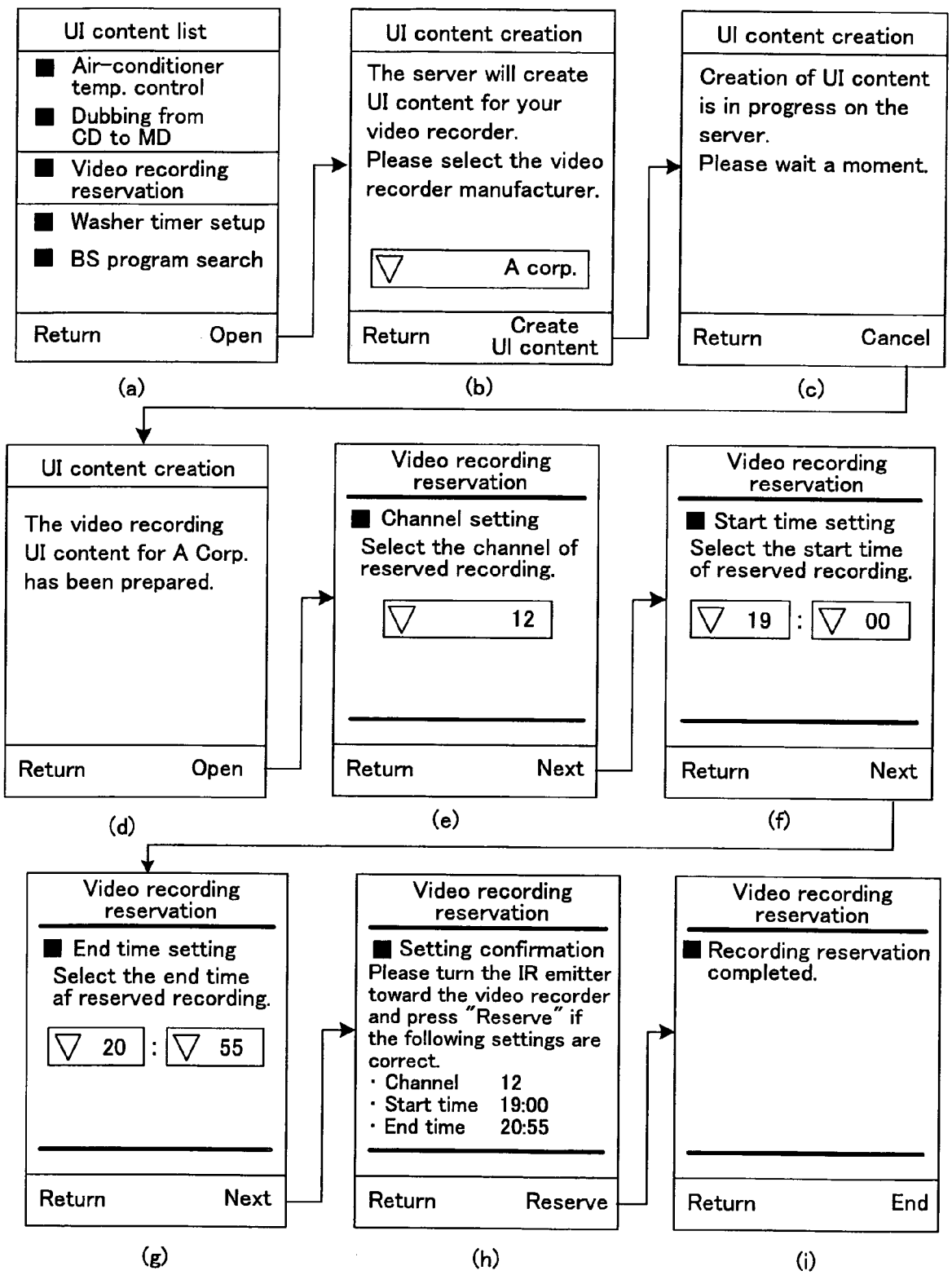
FIG. 2 is an illustrative diagram showing changes of UI content display for video recording reservation in a cellular phone.

FIG. 2 is an illustrative diagram showing display changes of the UI content for video recording reservation in the cellular phone.

This diagram shows the control procedures for making a video recording reservation on the hard disk recorder of AV appliance 50, and shows the details displayed on the liquid crystal display of cellular phone 60 based on the UI content sent from UI content creation server 10.

To begin with, in FIG. 2(*a*) the user selects one preferred UI content (here "video recording reservation" is selected) from the UI content list on cellular phone 60. As the "open" is pressed, the details of the UI content are displayed. Next, if it is the first time to select this UI content, a creation process of a new UI content starts (FIGS. 2(*b*) to (*d*)). When the UI content has already been prepared, it goes to the display of "video recording reservation" (FIG. 2(*e*)).

First, the case of first time selection will be described. As shown in FIG. 2(*b*), the display shows the start of preparation of UI content, and makes the user select the manufacturer of the user's video recorder (here, "A Corp." is selected). As the "UI content creation" button is pressed, a display shown in FIG. 2(*c*) appears. Cellular phone 60 displays "the UI content being created on the server" and transmits UI content creation request data to UI content creation server 10. UI content creation server 10, based on the received information "A Corp.", modifies the information acquisition location of the UI content creation data, processes the UI content creation data, creates the UI content, and transmits it to cellular phone 60.

On the cellular phone 60 side, the display shows that the UI content has been created, as shown in FIG. 2(*d*). As the "Open" button is pressed, the display goes to that of FIG. 2(*e*), to prompt designation of the channel to be recorded. The selected numeric is a media object in a document format, and the selected value replaces the original value. Next, entry of the start time of recording reservation is prompted as shown in FIG. 2(*f*). Then entry of the end time of the recording reservation is prompted as shown in FIG. 2(*g*). Further, confirmation of the settings up to here is prompted as shown in FIG. 2(*h*). Pressing "Reservation" causes infrared light for video recording reservation to be sent to the television. Next, as shown in FIG. 2(*i*), the display shows confirmation of successful reservation and pressing "End" causes the display to return to the initial UI content list.

Since UI content of this kind should be created for every operation step, creating the content for every individual step would make a too heavy burden for the content provider. Therefore, the content provider must have stored templates of content creation data beforehand in content creation server 10.

Figure 3:
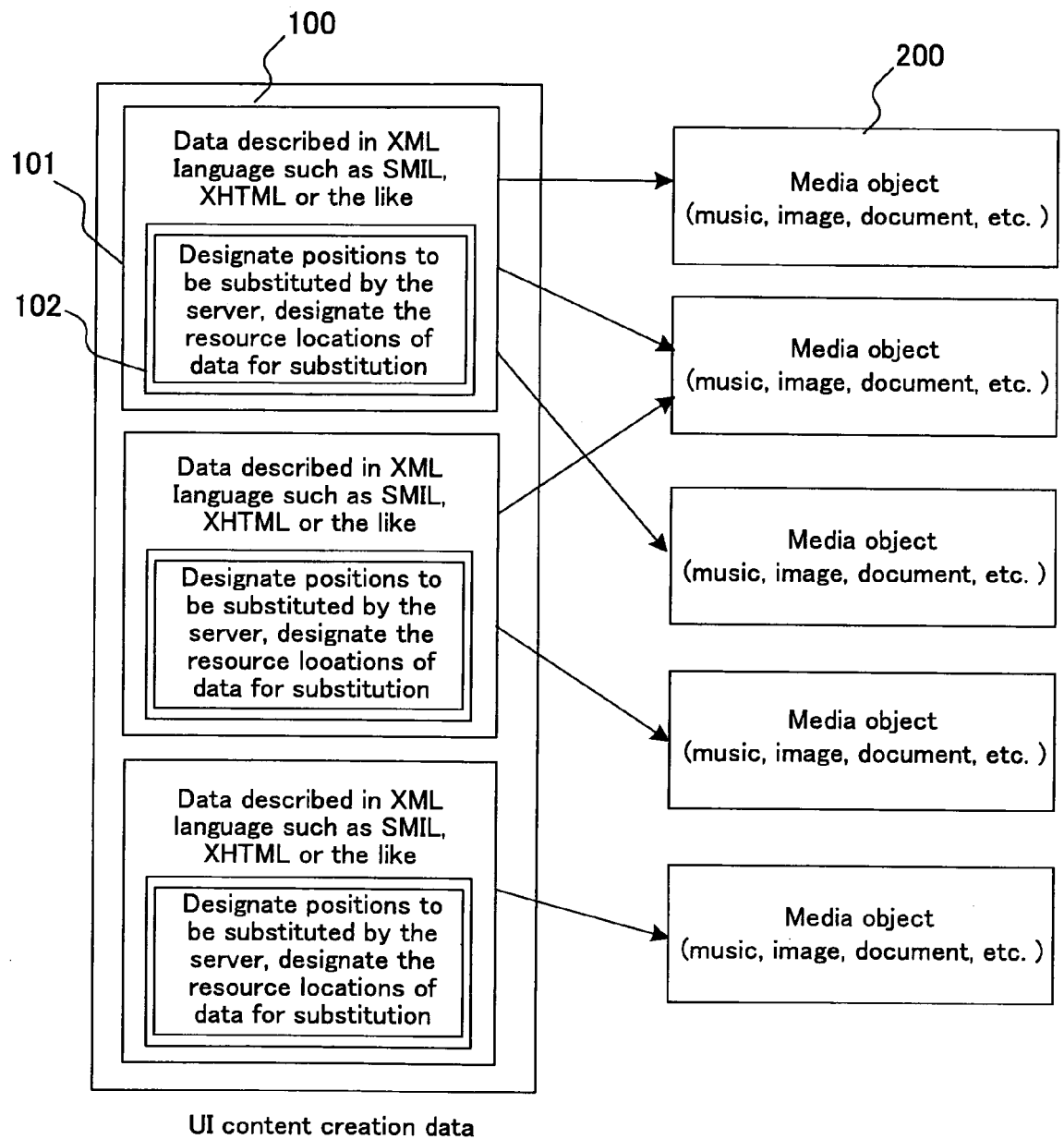
FIG. 3 is an illustrative diagram showing UI content creation data.

FIG. 3 is an illustrative view showing UI content creation data.

Content creation data 100 is made up of description data 101 written in XML (extensible Markup Language) language including SMIL (Synchronized Multimedia Integration Language), XHTML (extensible HyperText Markup Language) and the like. Description data 101 includes designation description data 102 such as designation of the part to be substituted by UI content creation server 10 and designation of data resources. Multiple items of content creation data as above have been stored in UI content creation server 10. Then, the data that is designated by designation description data 102 is downloaded by accessing media objects 200, such as music, images, documents and others, in information server 30.

The UI content creation data described above is a general example. The UI content creation data of the present embodiment will be described next. FIG. 4 is an illustrative diagram showing UI content creation data for video recording reservation.

As shown in FIG. 4, the data to be inserted into the variable part in the UI content creation data, specifically, infrared code information is taken in from television program information server 30 to cellular phone 60. That is, since the manufacturer of the video recorder has been selected in the display of FIG. 2(*b*), television program information server 30 modifies the destination of infrared code information resource based on the manufacturer information input through cellular phone 60 and transmits to cellular phone 60. This makes it possible for cellular phone 60 to implement recording reservation by infrared light for the video recorder as AV appliance 50.

Figure 5:
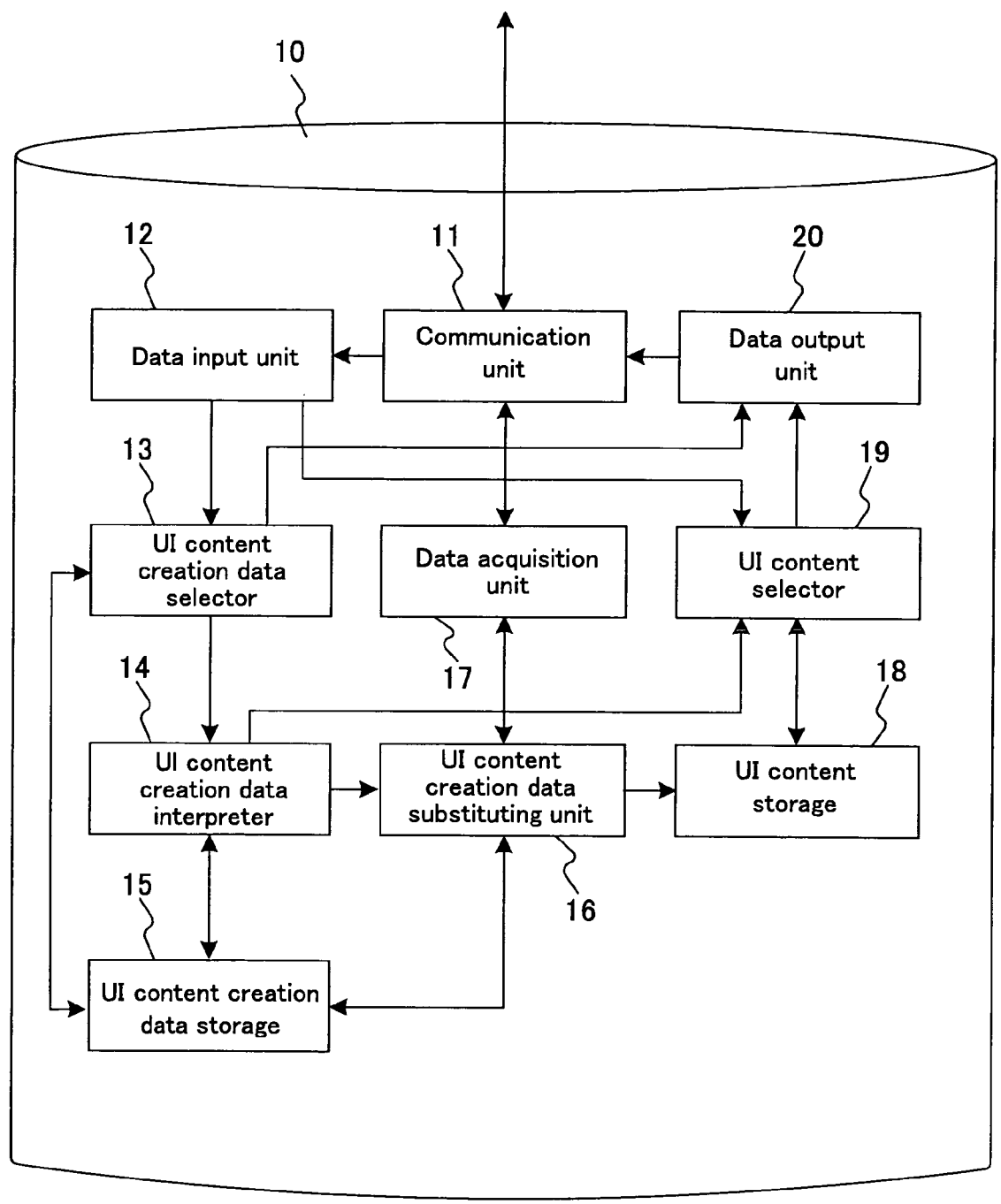
FIG. 5 is a block diagram showing a configuration of a UI content creation server.

FIG. 5 is a block diagram showing one configurational example of a UI content creation server.

UI content creation server 10 includes: a communication unit 11; a data input unit 12; a UI content data selector 13; a UI content creation data interpreter 14; a UI content creation data storage 15; a UI content creation data substituting unit 16; a data acquisition unit 17; a UI content storage 18; a UI content selector 19; and a data output unit 20.

Figure 6:
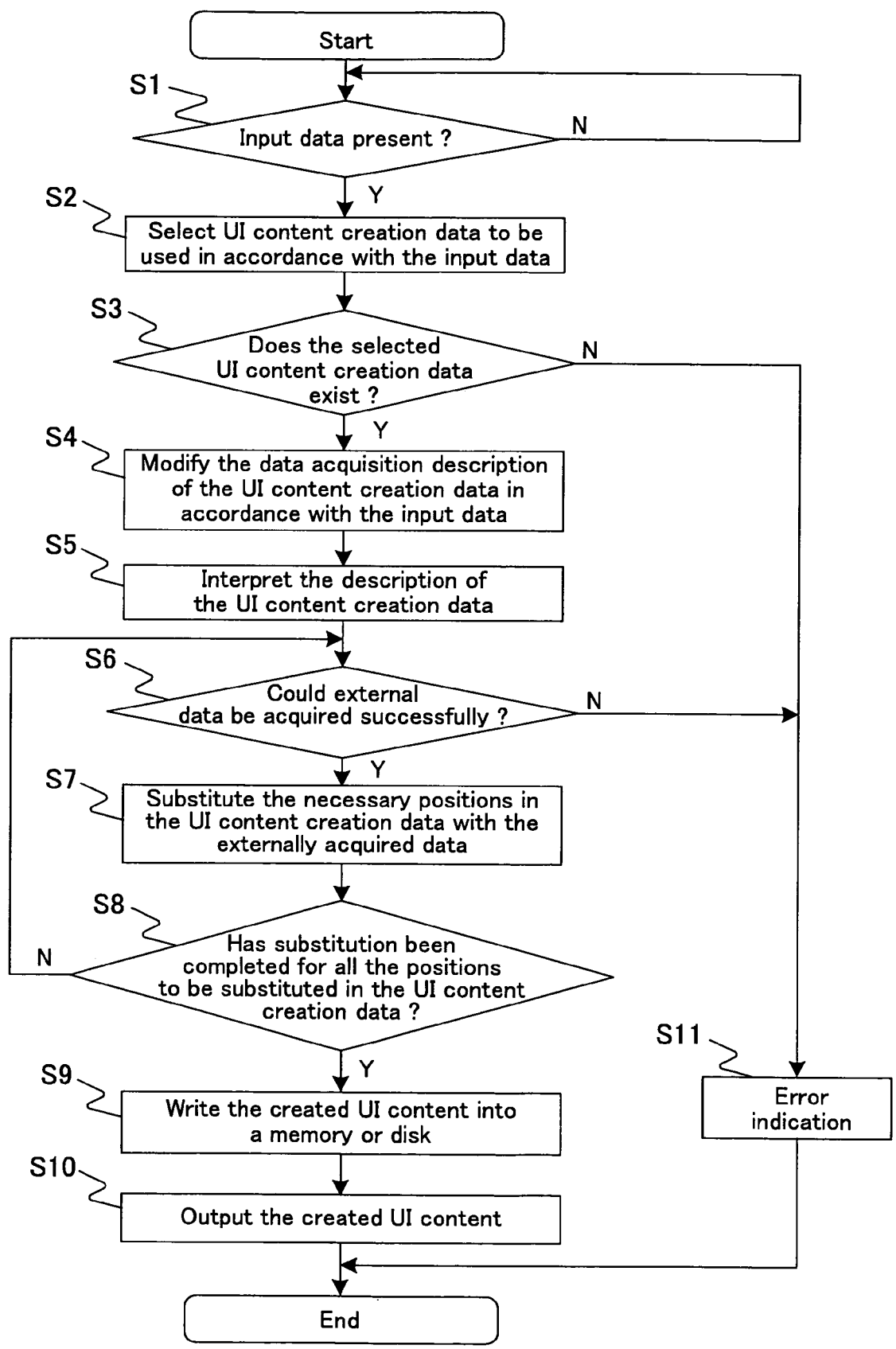
FIG. 6 is a flowchart showing the operation of a UI content creation server.

Next, the operation of the UI content creation server will be described. FIG. 6 is a flowchart showing the operation of this UI content creation server 10.

Suppose that the user has selected the video recording reservation from the UI content list using cellular phone 60, as shown in FIG. 2(*a*), for instance. This information is transmitted as UI content creation request data via cellular phone network 80 and Internet 70 and input to communication unit 11. Communication unit 11 sends the UI content creation request data to data input unit 12, so that UI content creation server 10 recognizes the presence of input data (UI content creation request data) (Step S1). Then, UI content creation data selector 13, in accordance with the input data, selects a template of UI content creation data to create UI content (Step S2). In this case, based on the UI content creation request data, all items of UI content creation data for a series of operations are selected. Then, whether the target UI content creation data is present or not in the UI content creation data storage 5 is checked (Step S3). If not stored, an error output is sent to data output unit 20, and data output unit 20 outputs error data to cellular phone 60 by way of communication unit 11, Internet 70 and cellular phone network 80 (Step S11).

In accordance with the input data (UI content creation request data), data acquisition description of the UI content creation data is modified (Step S4). If the target UI content creation data suited to the input data is present, UI content creation data interpreter 14 interprets description data 101 (especially, designation description data 102) of the UI content creation data (Step S5). Since the destination for substitution of designation description data 102 can be known from this, UI content creation data substituting unit 16 instructs data acquisition unit 17 to acquire data. Data acquisition unit 17 checks whether the target data can be obtained from the designated information server 30 via communication unit 11 (Step S6). If the data has been obtained, the operation goes to S7, so that the obtained substitution data is sent to UI content creation data substituting unit 16, which implements data substitution to create UI content. If no data is obtained, an error output is sent to data output unit 20. The data output unit 20 outputs error data to cellular phone 60 via communicating unit 11, Internet 70 and cellular phone network 80 (Step S11).

At Step S8, it is checked whether all the positions to be substituted in the UI content creation data have been filled with substitution data. If all the substitutions have been done the operation goes to Step S9 while if it is not so, the operation returns to Step S6. At Step S9, UI content storage 18 records the created UI content on a recording medium such as a memory, hard disk or the like. UI content selector 19, based on the UI content creation request data, selects the necessity items from multiple UI content items presenting a series of operations, and data output unit 20 delivers them to cellular phone 60 by means of communication unit 11 (Step S10).

Figure 7:
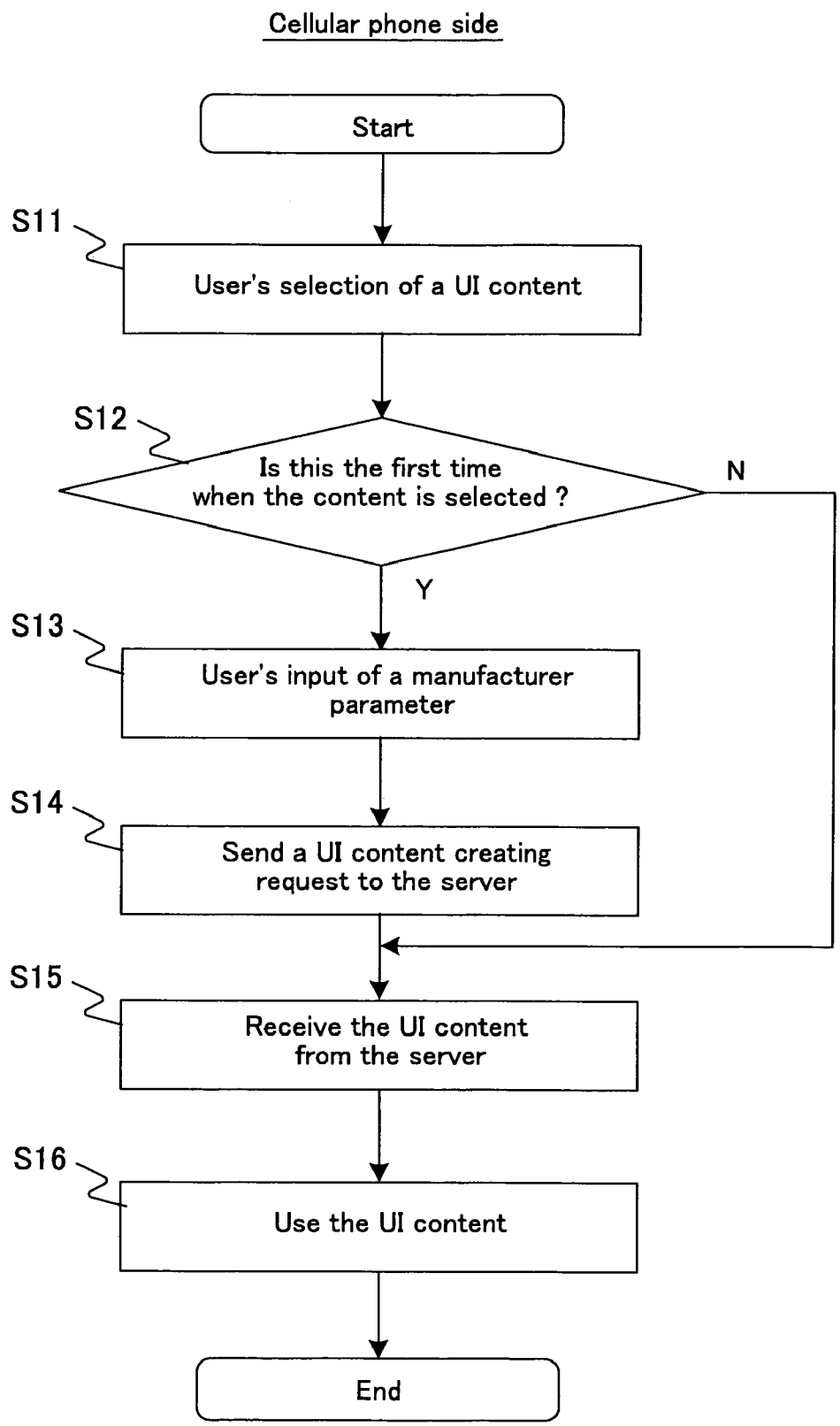
FIG. 7 is a flowchart showing control procedures of a cellular phone 60.

FIG. 7 is a flowchart showing control procedures of cellular phone 60. The user selects one UI content (Step S11). If it is the first time when the UI content has been selected, the operation goes to Step S13. If it is not the first time, the operation goes to Step S15. At Step S13, the user inputs a manufacturer parameter. Next, cellular phone 60 submits a UI content creation request to UI content creation server 10 (Step S14). At Step S15, cellular phone 60 receives the UI content from UI content creation server 10. Cellular phone 60 then displays the control procedures in accordance with the UI content (step 16).

In this way, the template of UI content creation data is interpreted based on the UI content creation request data from cellular phone 60 so as to create the UI content by acquiring information from external information server 30 via the Internet or the like. Therefore, it is possible to create various kinds of UI content instantly and easily without the necessity of storing data in UI content creation server 30.

Embodiment 2

Figure 8:
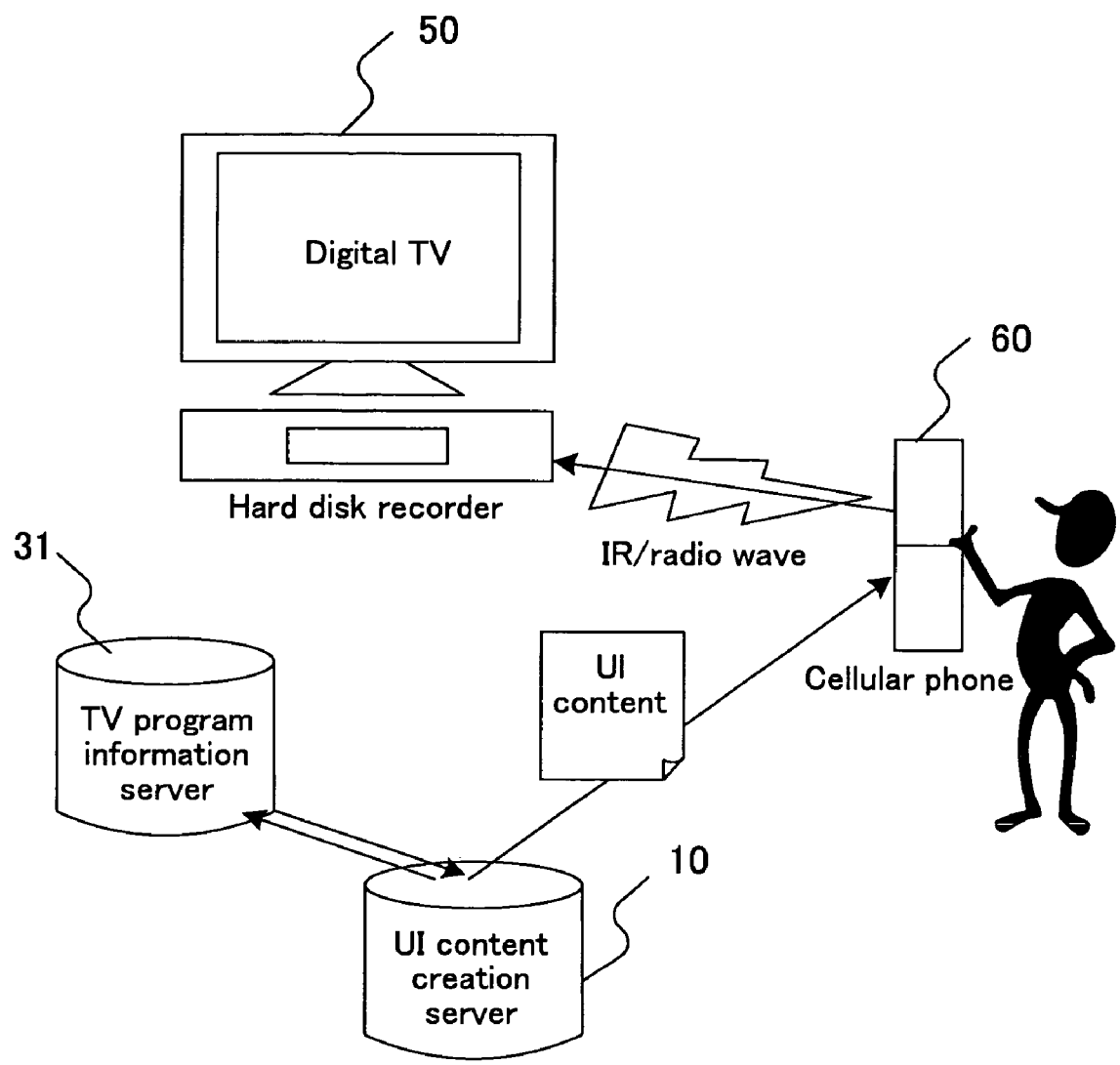
FIG. 8 is a structural diagram showing the second embodiment of a UI content creating system according to the present invention.

FIG. 8 is a structural diagram showing the second embodiment of a UI content creating system according to the present invention. In the second embodiment, the content provider provide "updated notice of recommended TV programs" via a TV program information server 31. UI content creation server 10, based on the notice, creates UI content from UI content creation data. Upon creation, similarly to the first embodiment, the server interprets the designated portions to be substituted in the UI content creation data and acquires program information from TV program information server 31 and implements substitution of the portions to be substituted in the UI content creation data to complete the UI content. This UI content is sent at the same time the "update notice of recommended TV programs" is delivered from UI content creation server 10 to cellular phone 60 via cellular phone network (or the Internet). The user implements the operation of "updated notice of recommended TV programs" in accordance with the UI content displayed on cellular phone 60. As the user has a preferred TV program displayed on cellular phone 60 and presses the button, cellular phone 60 transmits IR information for reproducing the specific video image stored in the hard disk recorder of AV appliance 50. The hard disk recorder receives the IR information and plays the designated video image.

In this way, the content provider distributes UI content to the terminal (cellular phone 60) the user uses.

In the case where TV program information service provider wants to provide video information for recommending the user to watch among a vast amount of videos (may be the videos of all the TV programs broadcast for past some days) stored in the hard disk recorder of AV appliance 50, UI content creation server 10 acquires the video information for recommendations to watch, and creates the UI content that permits playback by the user if the user wants, and transmits it to cellular phone 60 or a terminal. Upon creation, UI content creation server 10, using a single piece of UI content creation data, is able to create UI content capable of being used for reproducing various videos, easily.

FIG. 9 is an illustrative diagram showing display changes of UI content for video playback, on a cellular phone.

FIG. 9(a) shows the display on cellular phone 60 when the UI content is delivered thereto from UI content creation server 10. As the "Open the list" button is pressed, a UI content list display shown in FIG. 9(b) appears. As one UI content is selected and "Open" is pressed, the details of the UI content shown in FIG. 9(c) are displayed so that the contents of the program is displayed. As the "Watch this program" button is pressed, the display changes to the page shown in FIG. 9(d), to show the display for confirming whether the user will watch the program. As the user presses the "Playback start" button, the IR information for controlling the hard disk recorder is transmitted while the display returns to the UI content list representation.

Figure 10:
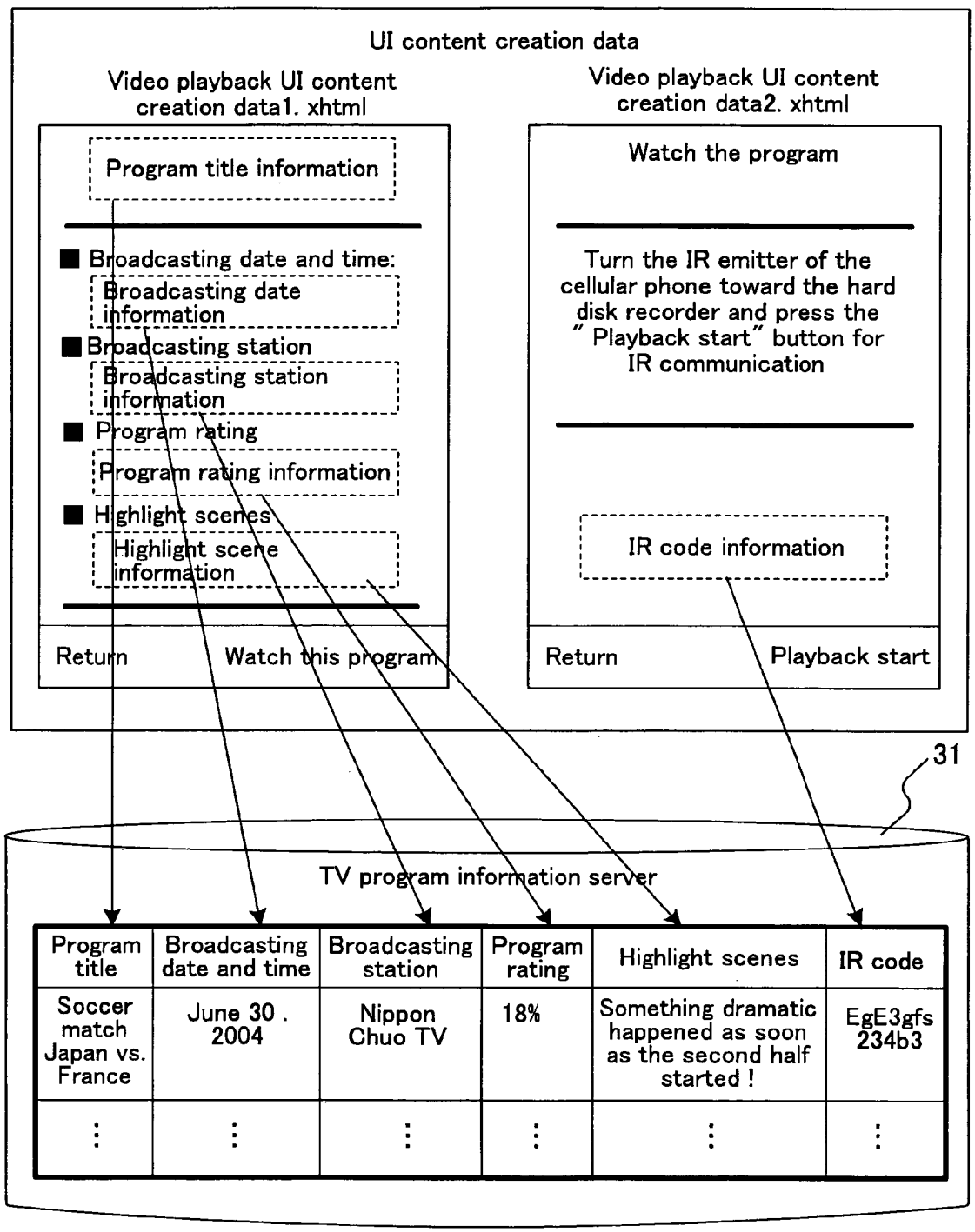
FIG. 10 is an illustrative diagram showing UI content creation data for video playback.

FIG. 10 is an illustrative diagram showing UI content creation data for video playback. The data to be inserted in the portions to be substituted in the UI content creation data is taken in from TV program information server 31. Information such as program title, broadcast date and time, broadcast station, program rating, the highlight scenes, IR code for the playback hard disk recorder is all taken in from TV program information server 31.

Specifically, the UI content creation data has tagged portions in which the designated sites for data acquisition (information storage locations in TV program information server 31) are written as shown in FIG. 11, and acquires data therefrom to replace the tag with that. As a result, the UI content with specific pieces of information written in as shown in FIG. 12 is created.

In this way, when information changes from time to time, simple substitution of changed data based on the UI content creation data makes it possible to prepare the UI content in an easy manner.

Figure 13:
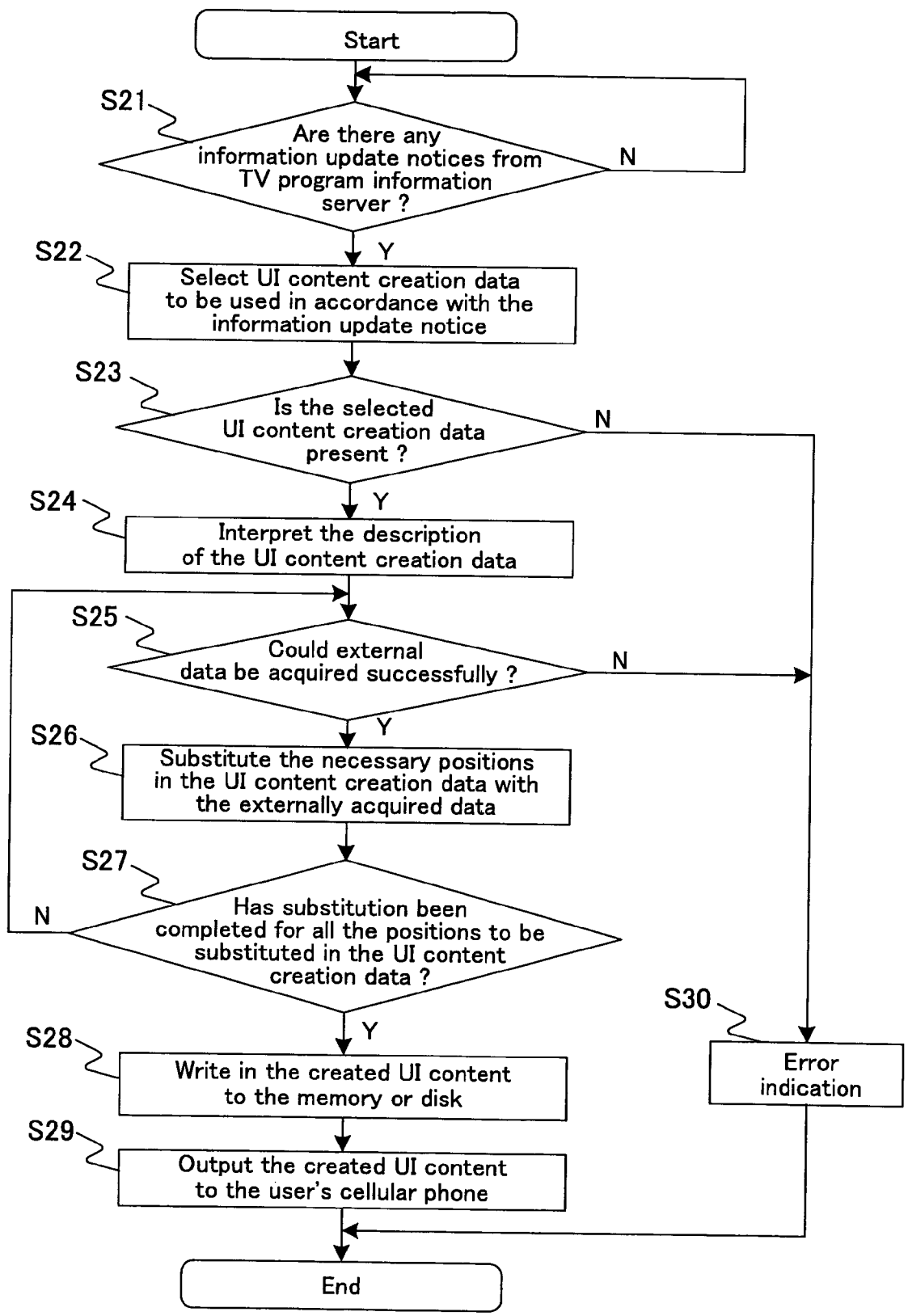
FIG. 13 is a flowchart showing the operation of a UI content creation server in the second embodiment.

Next, the operation of the UI content creation server will be described. FIG. 13 is a flowchart showing the operation of this UI content creation server 10.

Data input unit 10 of UI content creation server 10 checks whether there is any information update notice from TV program information server 31 (Step S21). Next, UI content creation data selector 13 selects a template of UI content creation data for creating UI content (Step S22). In this case, based on the UI content creation request data, all items of UI content creation data for a series of operations are selected. Then, whether the target UI content creation data is present or not in the UI content creation data storage 15 is checked (Step S23). If not stored, an error output is sent to data output unit 20, and data output unit 20 outputs an error indication to TV program information server 31 by way of communication unit 11 and Internet 70 (Step S30).

If the target UI content creation data is present, UI content creation data interpreter 14 interprets the description data (the tagged data in FIG. 11) of the UI content creation data (Step S24). Since the destination for substitution of the description data can be known from this, UI content creation data substituting unit 16 instructs data acquisition unit 17 to acquire data. Data acquisition unit 17 checks whether the target data can be obtained from the designated TV program information server 31 via communication unit 11 (Step S25). If the data has been obtained, the operation goes to S26, so that the obtained substitution data is sent to UI content creation data substituting unit 16, and the UI content creation data substituting unit 16 implements data substitution to create UI content. If no data is obtained, an error output is sent to data output unit 20, and the data output unit 20 outputs an error indication to TV program information server 31 via communicating unit 11 (Step S30).

At Step S27, it is checked whether all the positions to be substituted in the UI content creation data have been filled with substitution data. If all the substitutions have been done the operation goes to Step S28 while if it is not so, the operation returns to Step S25. At Step S28, UI content storage 18 records the created UI content on a recording medium such as a memory, hard disk or the like. UI content selector 19, based on the UI content creation request data, selects the necessity items from multiple UI content items presenting a series of operations, and data output unit 20 delivers them to cellular phone 60 via communication unit 11 (Step S29).

In this way, in accordance with the update notice from TV program information server 31, the template of UI content creation data is interpreted so as to create the UI content by acquiring information from TV program information server 31 via the Internet or the like. Therefore, it is possible to create various kinds of UI content instantly and easily without the necessity of storing data in the UI content creating apparatus.

Embodiment 3

Figure 14:
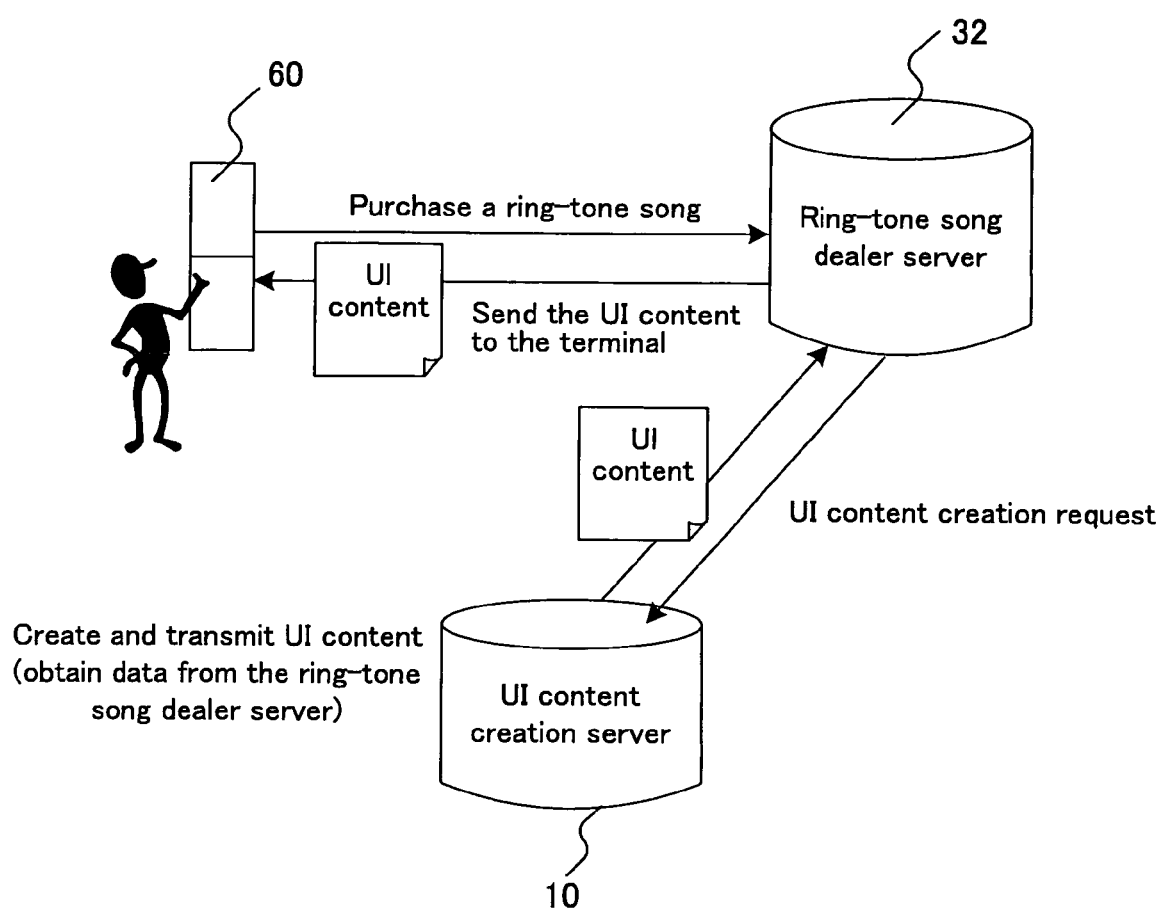
FIG. 14 is a structural diagram showing the third embodiment of a UI content creating system according to the present invention.

The third embodiment presents an example for creation of UI content for trial-listening of ring-tone songs and purchasing a preferred ring-tone song. FIG. 14 is a structural diagram showing the third embodiment of a UI content creating system according to the present invention. In the third embodiment, UI content creation request data is sent from the ring-tone song dealer server (information server) 32 to UI content creation server 10. UI content creation server 10 selects UI content creation data to be used and creates the UI content by acquiring external data for substitution from ring-tone song dealer server 32, and also sends the created UI content to ring-tone song dealer sever 32. Ring-tone song dealer server 32 transmits the created UI content to user's cellular phone 60. The user opens the UI contents on cellular phone 60 and trial-listens ring-tone songs. If the user finds a favorite one, the user can connect to ring-tone song dealer server 32 using the UI content and buy it.

Figure 15:
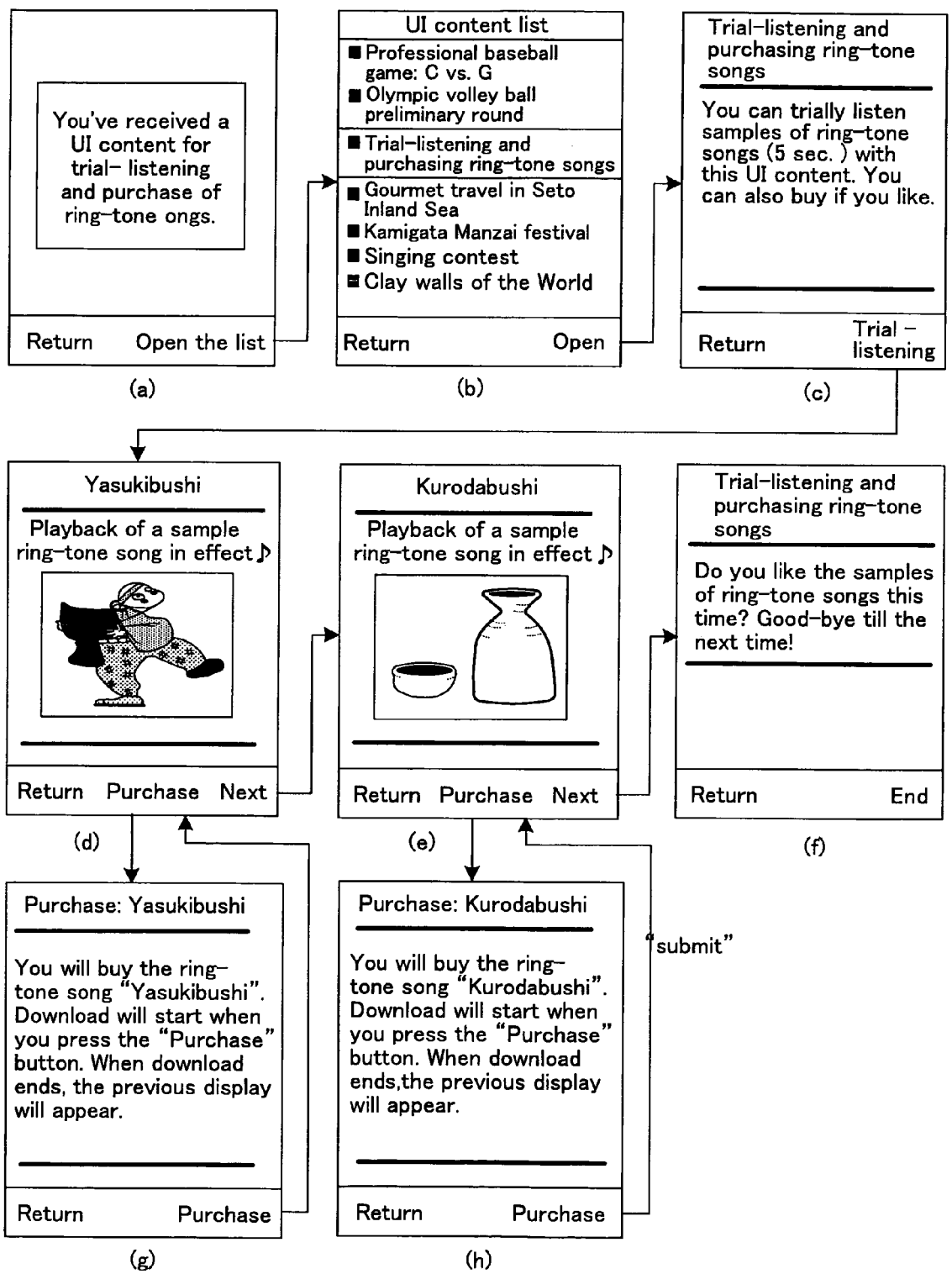
FIG. 15 is an illustrative diagram showing display changes of UI content for ring-tone songs in a cellular phone.

FIG. 15 is an illustrative diagram showing display changes of UI content for ring-tone songs in a cellular phone.

FIG. 15(*a*) shows the display when the UI content has been delivered from ring-tone song dealer server 32. As the "Open the list" button is pressed, a UI content list display shown in FIG. 15(*b*) appears. As "Trial-listen/purchase songs" is selected and "Open" is pressed, the UI content shown in FIG. 15(*c*) is displayed for trial-listening and buying ring-tone songs. As the "Trial-listen" button is pressed, the display changes into the page shown in FIG. 15(*d*), and sample music of a ring-tone song is reproduced while the user is being asked whether to buy the ring-tone song. If the user presses the "Purchase" button, the display changes to the purchase command frame shown in FIG. 15(*g*). As the "Purchase" button is pressed, the ring-tone song starts downloading. Then the display returns to the frame shown in FIG. 15(*d*), and as "Next" is pressed, the next ring-tone song is displayed as shown in FIG. 15(*e*), asking the user whether to buy the ring-tone song. As the user presses the "Purchase" button, the display goes to the purchase command frame shown in FIG. 15(*h*). As the "Purchase" button is pressed, the ring-tone song starts downloading. Then the display returns to the frame shown in FIG. 15(*e*), and as "Next" is pressed, the end frame shown in FIG. 15(*f*) appears. If the user does not want to buy, the "Next" button may be pressed at the steps (d) and (e) instead of the "Purchase" button, and the display changes to the next display.

Figure 16:
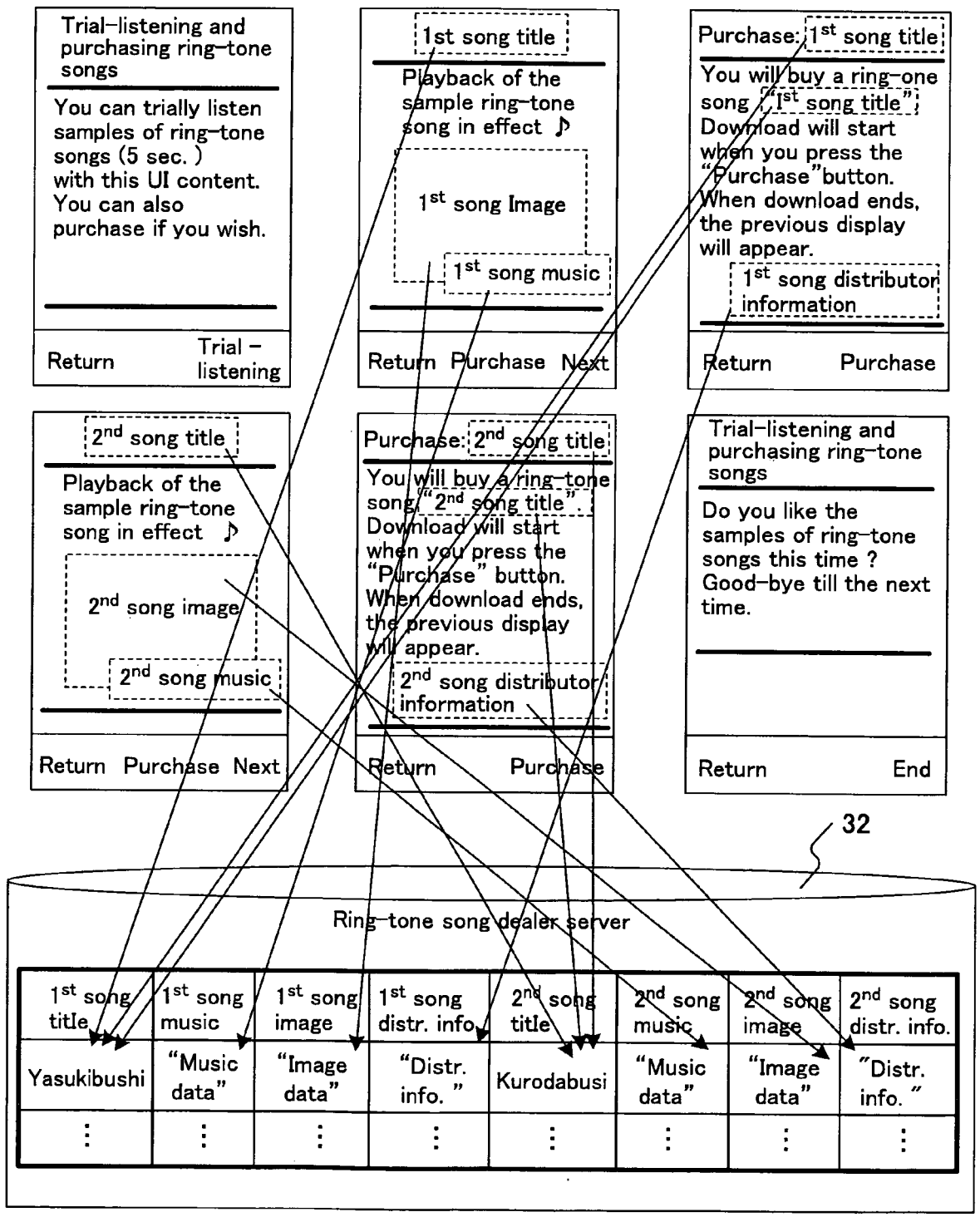
FIG. 16 is an illustrative view showing UI content creation data for ring-tone songs.

FIG. 16 is an illustrative view showing the UI content creation data for ring-tone songs. The data to enter the portions to be substituted in the UI content creation data is taken in from ring-tone song dealer server 32. For example, song titles, music data to be taken in, dealer information and other information are all taken in from dealer server 32.

In this way, when information changes from time to time, simple substitution of changed data based on the UI content creation data makes it possible to prepare the UI content in an easy manner.

Embodiment 4

Figure 17:
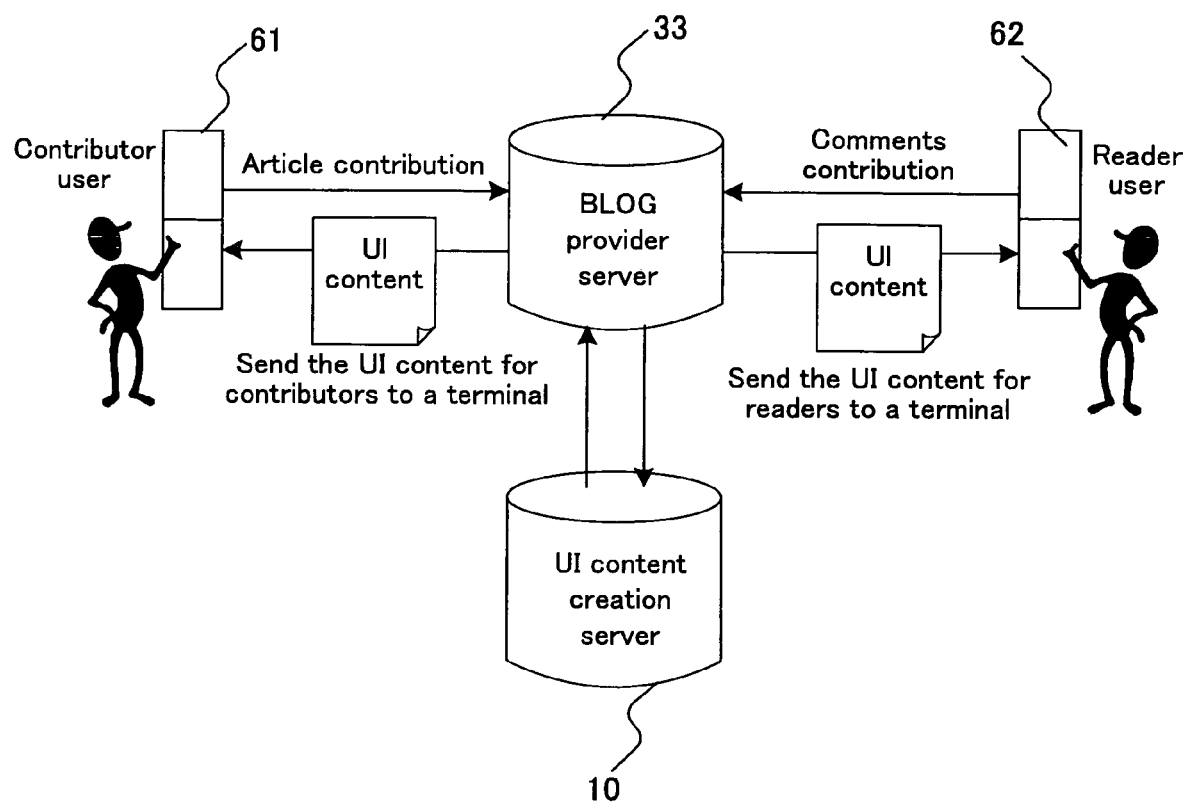
FIG. 17 is a structural diagram showing the fourth embodiment of a UI content creating system according to the present invention.

The fourth embodiment is an example of creating UI content for facilitating usage of BLOG (personal journal service on the Internet). FIG. 17 is a structural diagram showing the fourth embodiment of a UI content creating system according to the present invention.

A BLOG provider server (information server) 33 sends UI content creation request data to UI content creation server 10. UI content creation server 10 obtains data for BLOG contribution from BLOG provider server 33 and creates the UI content and returns it to BLOG provider server 33. BLOG provider server 33 forwards the UI content to a cellular phone 61 of a contributor user. The contributor user prepares an article (information prepared on a terminal) using the UI content and submits it to BLOG provider server 33.

BLOG provider server 33 can disclose this article to other cellular phones 61 and makes UI content creation server 10 prepare UI content for readers, and sends it to cellular phones 61. The users using cellular phones 61 can read the article following this UI content and also submit comments etc.

Figure 18:
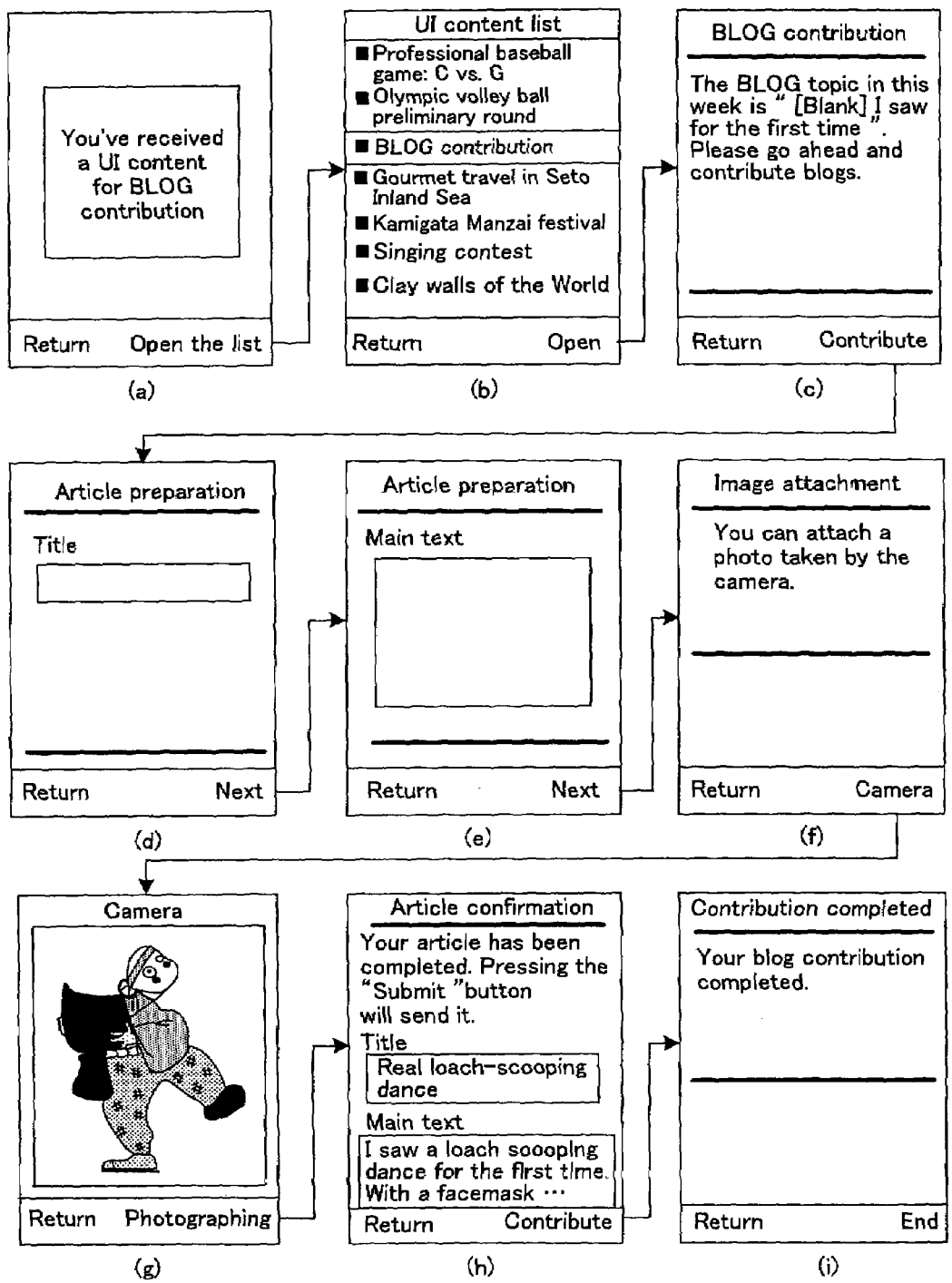
FIG. 18 is an illustrative view showing display changes of UI content for BLOG contribution in a cellular phone.

FIG. 18 is an illustrative view showing display changes of UI content for BLOG contribution in a cellular phone.

FIG. 18(*a*) shows the display when UI content is delivered from ring-tone song dealer server 33. As the "Open the list" button is pressed, a UI content list display shown in FIG. 18(*b*) appears. As "BLOG contribution" is selected and "Open" is pressed, the detail of the UI content shown in FIG. 18(*c*) is displayed so that the content of BLOG contribution is displayed. As the "Contribute" button is pressed, a page shown in FIG. 18(*d*) appears so as to allow for title entry. As the user presses the "Next" button, a display frame for article composition shown in FIG. 18(*e*) appears so as to allow for entry of main text. As the "Next" button is pressed, a display page for attachment of images shown in FIG. 18(*f*) appears, asking whether to take a photo with camera. As the "camera" button is pressed, the camera function of cellular phone 61 is activated to display the image pickup target. As the "exposure" button is pressed, cellular phone 61 takes a photo and an article check page shown in FIG. 18(*h*) appears. As the "Submit" button is pressed, the contribution complete display shown in FIG. 18(*i*) appears.

Figure 19:
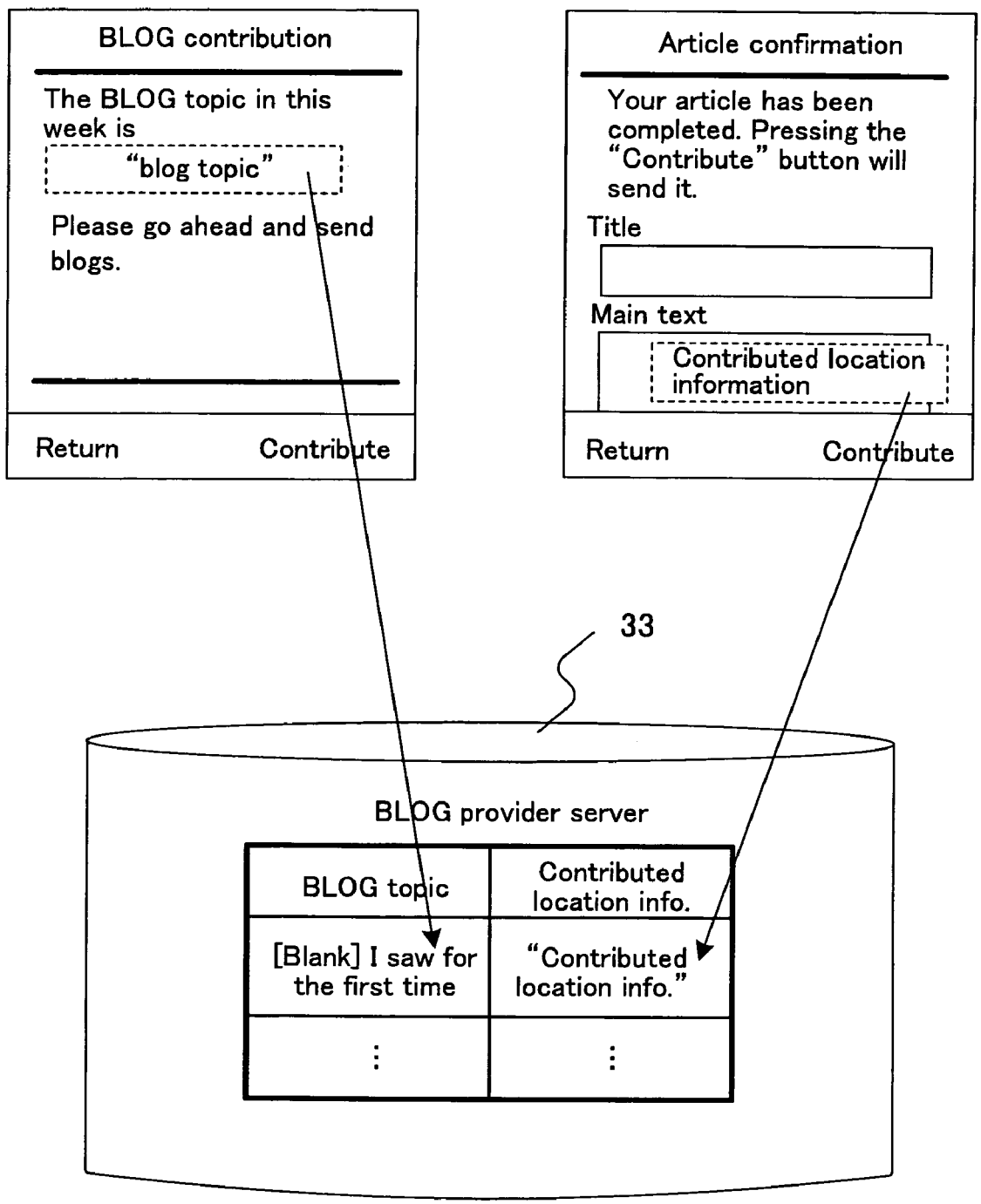
FIG. 19 is an illustrative view showing UI content creation data for BLOG contribution.

FIG. 19 is an illustrative diagram showing UI content creation data for BLOG contribution. The data to enter the portions to be substituted in the UI content creation data is taken in from BLOG provider server 33. For example, contribution topics, where to submit and other information are all taken in from BLOG provider server 33.

In this way, when information changes from time to time, simple substitution of changed data based on the UI content creation data makes it possible to prepare the UI content in an easy manner.

BLOG provider server 33 sends UI content creating request data to UI content creation server 10. UI content creation server 10 acquires data for BLOG reading from BLOG creation server 33 and creates UI content and returns it to BLOG provider server 33. BLOG provider server 33 forwards the UI content to cellular phones 62 of reader users. Reader users can check and read articles using the UI content and submit comments to BLOG provider server 33.

Figure 20:
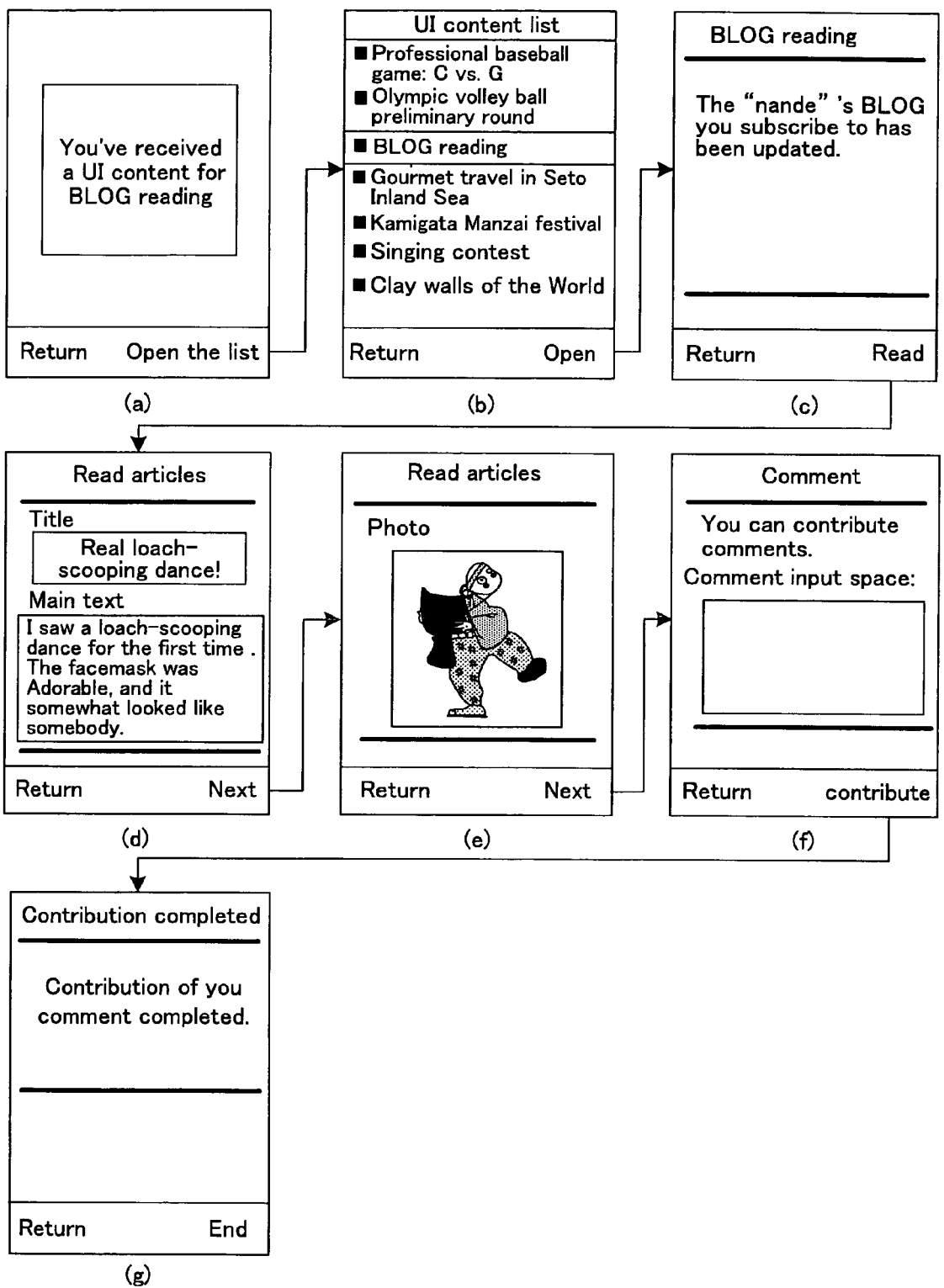
FIG. 20 is an illustrative view showing display changes of UI content for BLOG reading in a cellular phone.

FIG. 20 is an illustrative view showing display changes of UI content for BLOG reading on a cellular phone.

FIG. 20(*a*) shows the display when UI content is delivered from BLOG provider server 33. As the "Open the list" button is pressed, a UI content list display shown in FIG. 20(*b*) appears. As "BLOG reading" is selected and "Open" is pressed, the detail of the UI content shown in FIG. 20(*c*) is displayed so that the content of BLOG readers is displayed. As the "Read" button is pressed, display changes to a page shown in FIG. 20(*d*) and an article content is displayed. As the user presses the "Next" button, display changes to a photo display frame shown in FIG. 20(*e*) so as to display the taken image. As the "Next" button is pressed, display changes to a comment input frame shown in FIG. 20(*f*) so as to allow for comment input. As the "Submit" button is pressed, the contribution complete display shown in FIG. 20(*g*) appears.

Figure 21:
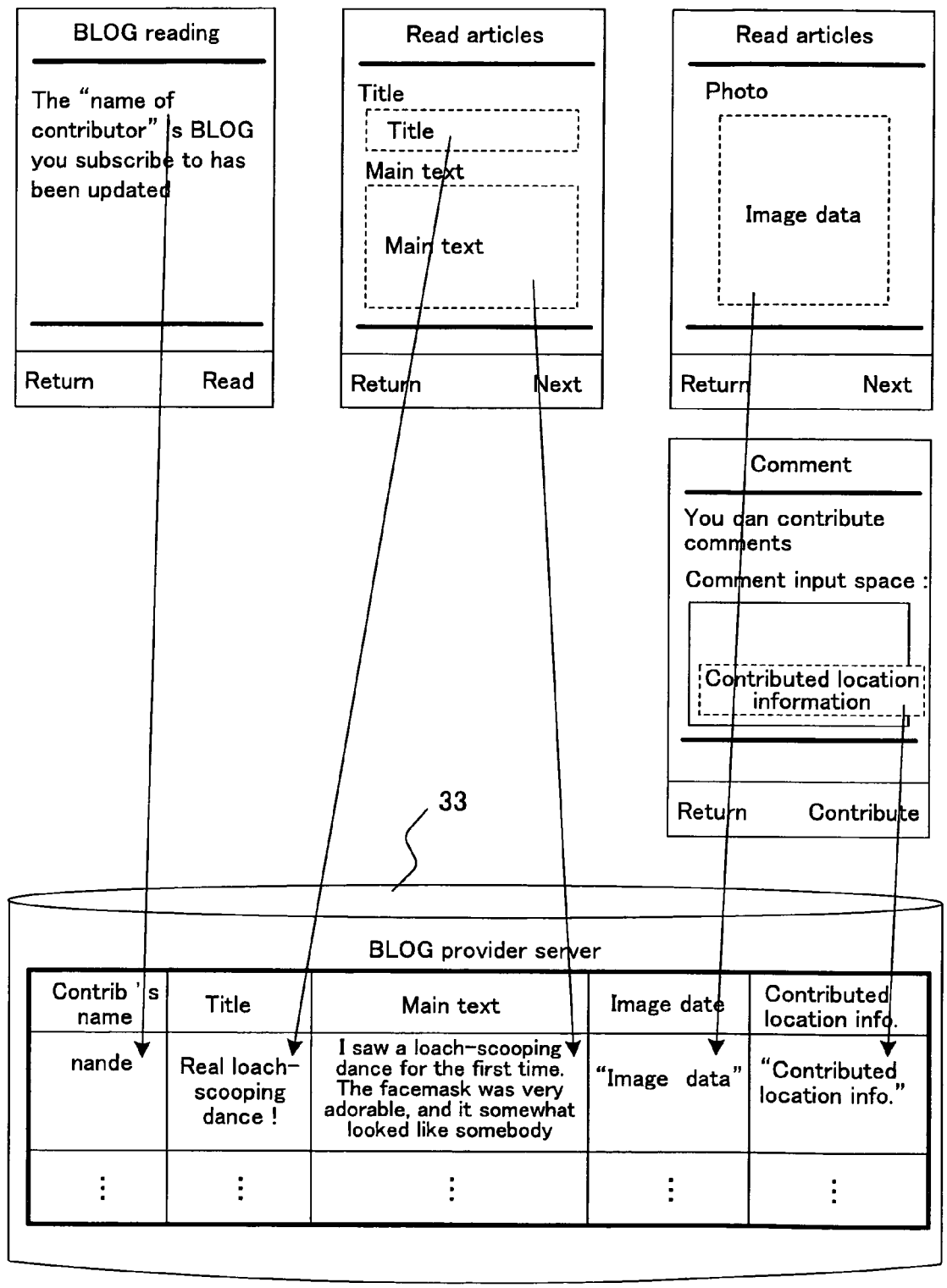
FIG. 21 is an illustrative view showing UI content creation data for BLOG reading.

FIG. 21 is an illustrative diagram showing UI content creation data for BLOG reading. The data to enter the portions to be substituted in the UI content creation data is taken in from BLOG provider server 33. For example, names of contributors, article topics, main text, photos, where to submit and other information are all taken in from BLOG provider server 33.

In this way, when information changes from time to time, simple substitution of changed data based on the UI content creation data makes it possible to prepare the UI content in an easy manner.

The invention claimed is:

1. A UI content creating method for providing UI content presenting a series of control procedures for a user terminal, comprising:
    a step of receiving the input of UI content creation request data via a communication means;
    a step of interpreting the UI content creation data presenting the positions to be substituted with data and the resource locations of the data for substitution, based on the received UI content creation request data, in order to create UI content;
    a step of creating UI content data by acquiring data by the communication means and entering the data into the positions to be substituted in the UI content creation data, in accordance with the interpreted positions to be substituted and the indication of the data resource locations;
    a step of outputting the UI content data to the terminal by way of the communication means;
    a step of selecting UI content creation data from a UI content creation data storage means that stores the UI content creation data, based on the creation request data;
    a step of storing all items of created UI content after creation of UI content data; and
    a step of selecting the necessary items of UI content from the UI content storage means, in accordance with the creation request data.

2. A UI content creating method for providing UI content presenting a series of control procedures for a digital electrical appliance by a user on a user terminal, comprising:
    a step of receiving the input of UI content creation request data via a communication means;
    a step of interpreting the UI content creation data presenting the positions to be substituted with data and the resource locations of the data for substitution, based on the received UI content creation request data, in order to create UI content;
    a step of creating UI content data by acquiring data by the communication means and entering the data into the positions to be substituted in the UI content creation data, in accordance with the interpreted positions to be substituted and the indication of the data resource locations; and
    a step of outputting the UI content data to the terminal by way of the communication means.

3. A UI content creating apparatus for providing UI content presenting a series of control procedures for a digital electrical appliance by a user on a user terminal, comprising:
    a communication means for implementing data communication with the outside;
    an input means for receiving the input of UI content creation request data via the communication means;
    a UI content creation data interpreting means for interpreting the UI content creation data presenting the positions to be substituted with data and the resource locations of the data for substitution, based on the received UI content creation request data;
    a UI content creation data substituting means for creating UI content data by acquiring data by the communication means and entering the data into the positions to be substituted in the UI content creation data, in accordance with the interpreted positions to be substituted and the indication of the data resource locations; and
    a UI content data output means for outputting the UI content data to the terminal by way of the communication means.

4. A UI content creating system comprising:
    a UI content creating apparatus according to claim 3;
    a terminal for receiving provision of UI content; and,
    an information server for providing data for creating UI content to the UI content creating apparatus, all the components being connected through a network or communications net, the system characterized in that the terminal outputs UI content creation request data to the UI content creating apparatus, and the UI content creating apparatus outputs the created UI content to the terminal.

5. UI content creating system according to claim 4, wherein when the user selects an operation that needs a Previously Presented UI content, the terminal outputs data for a creation request of the UI content.

6. A UI content creating system comprising:
a UI content creating apparatus according to claim 3;
a terminal for receiving provision of UI content; and,
an information server for providing data for creating UI content to the UI content creating apparatus, all the components being connected through a network or communications net, the system characterized in that the information server outputs UI content creation request data to the UI content creating apparatus, and the UI content creating apparatus outputs the created UI content to the terminal.

7. A UI content creating system comprising:
a UI content creating apparatus according to claim 3;
a terminal for receiving provision of UI content; and,
an information server for providing data for creating UI content to the UI content creating apparatus, all the components being connected through a network or communications net, the system characterized in that the information server outputs UI content creation request data to the UI content creating apparatus and outputs the created UI content to the terminal, and the UI content creating apparatus outputs created UI content to the information server.

8. The UI content creating system according to claim 7, wherein the terminal establishes connection with the information server by means of the UI content and obtains the necessary information therefrom.

9. A UI content creating system comprising:
a UI content creating apparatus according to claim 3;
a terminal for receiving provision of UI content; and,
an information server for providing data for creating UI content to the UI content creating apparatus, all the components being connected through a network or communications net,
the system characterized in that the information server outputs UI content creation request data to the UI content creating apparatus and outputs the created UI content to the terminal, the UI content creating apparatus outputs created UI content to the information server, and the terminal outputs the information that is prepared on the terminal in accordance with the UI content, to the information server.

10. The UI content creating system according to claim 9, wherein the information server is able to disclose the information prepared by the terminal to other terminals and outputs a UI content that allows for reading of the terminal-created information to each terminal.

11. A UI content creating apparatus for providing UI content presenting a series of control procedures for a user terminal, comprising:
a communication means for implementing data communication with the outside;
an input means for receiving the input of UI content creation request data via the communication means;
a UI content creation data interpreting means for interpreting the UI content creation data presenting the positions to be substituted with data and the resource locations of the data for substitution, based on the received UI content creation recluest data;
a UI content creation data substituting means for creating UI content data by acquiring data by the communication means and entering the data into the positions to be substituted in the UI content creation data, in accordance with the interpreted positions to be substituted and the indication of the data resource locations;
a UI content data output means for outputting the UI content data to the terminal by way of the communication means;
a UI content creation data storage means for storing the UI content creation data;
a UI content creation data selecting means for selecting UI content creation data from the UI content creation data storage means, based on the input UI content creation request data;
a UI content storage means for storing all items of created UI content; and
a UI content selecting means for selecting the necessary items of UI content from the UI content storage means, in accordance with the creation request data.

12. A UI content creating system comprising:
a UI content creating apparatus according to claim 11;
a terminal for receiving provision of UI content; and,
an information server for providing data for creating UI content to the UI content creating apparatus, all the components being connected through a network or communications net, the system characterized in that the terminal outputs UI content creation request data to the UI content creating apparatus, and the UI content creating apparatus outputs the created UI content to the terminal.

13. UI content creating system according to claim 12, wherein when the user selects an operation that needs a Previously Presented UI content, the terminal outputs data for a creation request of the UI content.

14. A UI content creating system comprising:
a UI content creating apparatus according to claim 11;
a terminal for receiving provision of UI content; and,
an information server for providing data for creating UI content to the UI content creating apparatus, all the components being connected through a network or communications net, the system characterized in that the information server outputs UI content creation request data to the UI content creating apparatus, and the UI content creating apparatus outputs the created UI content to the terminal.

15. A UI content creating system comprising:
a UI content creating apparatus according to claim 11;
a terminal for receiving provision of UI content; and,
an information server for providing data for creating UI content to the UI content creating apparatus, all the components being connected through a network or communications net, the system characterized in that the information server outputs UI content creation request data to the UI content creating apparatus and outputs the created UI content to the terminal, and the UI content creating apparatus outputs created UI content to the information server.

16. The UI content creating system according to claim 15, wherein the terminal establishes connection with the information server by means of the UI content and obtains the necessary information therefrom.

17. A UI content creating system comprising:
a UI content creating apparatus according to claim 11;
a terminal for receiving provision of UI content; and,
an information server for providing data for creating UI content to the UI content creating apparatus, all the components being connected through a network or communications net, the system characterized in that the information server outputs UI content creation request data to the UI content creating apparatus and outputs the created UI content to the terminal, the UI content creating apparatus outputs created UI content to the information server, and the terminal outputs the information that is prepared on the terminal in accordance with the UI content, to the information server.

18. The UI content creating system according to claim 17, wherein the information server is able to disclose the information prepared by the terminal to other terminals and outputs a UI content that allows for reading of the terminal-created information to each terminal.

* * * * *